(12) United States Patent
Kikuchi et al.

(10) Patent No.: US 10,108,235 B2
(45) Date of Patent: Oct. 23, 2018

(54) INFORMATION PROCESSING APPARATUS AND HEAT EXCHANGER

(71) Applicant: FUJITSU LIMITED, Kawasaki-shi, Kanagawa (JP)

(72) Inventors: Shunichi Kikuchi, Yokohama (JP); Michimasa Aoki, Kawasaki (JP); Masumi Suzuki, Kawasaki (JP); Mitsutaka Yamada, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/722,337

(22) Filed: Oct. 2, 2017

(65) Prior Publication Data

US 2018/0113494 A1 Apr. 26, 2018

(30) Foreign Application Priority Data

Oct. 21, 2016 (JP) .................................. 2016-207218

(51) Int. Cl.
*G06F 1/20* (2006.01)

(52) U.S. Cl.
CPC .......... *G06F 1/20* (2013.01); *G06F 2200/201* (2013.01); *G06F 2200/202* (2013.01)

(58) Field of Classification Search
CPC ... H01L 23/427; H01L 23/34; F28D 15/0233; F28D 15/00; F28D 15/0266; F28D 15/0275; F28D 1/05366; F28D 2021/0031; F28D 1/05383; F28D 1/0316; F28D 1/0366; F28D 5/00; F28D 1/0233; F28D 1/0246; F28D 9/005; F28D 9/0081; H05K 7/20218; H05K 7/20336; H05K 7/20781; H05K 7/20263; H05K 7/20809; G06F 1/20;
(Continued)

(56) References Cited

U.S. PATENT DOCUMENTS 5,226,235 A * 7/1993 Lesage ..................... F28F 1/32
165/149
6,047,769 A 4/2000 Shimoya et al.
(Continued)

FOREIGN PATENT DOCUMENTS

JP 04-138571 U 12/1992
JP 10-478884 A 2/1998
(Continued)

*Primary Examiner* — James Wu
*Assistant Examiner* — Michael Matey
(74) *Attorney, Agent, or Firm* — Fujitsu Patent Center

(57) ABSTRACT

An information processing apparatus is disclosed. The information processing apparatus includes a first heat emitting device and a heat exchanger. The heat exchanger includes a first layered structure of layers of a plurality of first flow channel members having one or more first flow channels formed therein for a first coolant that is liquid, a first header in fluid communication with the first flow channel members, a second layered structure of layers of a plurality of second flow channel members having one or more second flow channels formed therein for a second coolant that is liquid, and a second header in fluid communication with the second flow channel members. The first and the second layered structures are overlapped in a first region when viewed in a layered direction, and at least one of the first and the second layered structures has space between layers in a second region.

14 Claims, 17 Drawing Sheets

(58) Field of Classification Search
CPC . G06F 2200/201; F28F 2210/00; F28F 9/182; F28F 9/22
See application file for complete search history.

(56) References Cited

U.S. PATENT DOCUMENTS

| | | | | |
|---|---|---|---|---|
| 6,272,881 | B1 * | 8/2001 | Kuroyanagi | F28D 1/035 165/153 |
| 7,009,146 | B2 * | 3/2006 | Torigoe | F28D 1/0246 219/202 |
| 7,234,511 | B1 * | 6/2007 | Lesage | B21D 53/085 165/149 |
| 7,998,345 | B2 * | 8/2011 | Jia | B01D 11/043 210/175 |
| 8,739,406 | B2 * | 6/2014 | Campbell | B23P 15/26 29/890.035 |
| 2003/0051501 | A1 * | 3/2003 | Matsushima | F25B 39/02 62/435 |
| 2005/0259397 | A1 * | 11/2005 | Bash | G06F 1/20 361/699 |
| 2006/0162898 | A1 * | 7/2006 | Reyzin | F28D 15/00 165/80.4 |
| 2008/0289802 | A1 * | 11/2008 | Nakajima | F28D 1/0341 165/104.31 |
| 2011/0120685 | A1 * | 5/2011 | Van Heeswijk | B01D 53/265 165/170 |
| 2011/0173813 | A1 * | 7/2011 | Tochon | B01J 19/249 29/890.03 |
| 2011/0272128 | A1 * | 11/2011 | Suzuki | F28D 1/0476 165/185 |
| 2013/0041050 | A1 * | 2/2013 | Luzenski | B01J 19/0093 518/706 |
| 2014/0071623 | A1 * | 3/2014 | Suzuki | H05K 7/20636 361/699 |
| 2014/0071624 | A1 * | 3/2014 | Aoki | H01L 23/467 361/699 |
| 2014/0202189 | A1 | 7/2014 | Sathe et al. | |
| 2015/0043148 | A1 * | 2/2015 | Zhang | H05K 7/20727 361/679.32 |
| 2017/0016677 | A1 * | 1/2017 | Cheong | F28F 9/16 |

FOREIGN PATENT DOCUMENTS

| | | |
|---|---|---|
| JP | 11-287580 A | 10/1999 |
| JP | 2008-122058 A | 5/2008 |
| JP | 2010-107055 A | 5/2010 |
| JP | 2014-518453 A | 7/2014 |
| WO | WO 2012/174062 A1 | 12/2012 |

* cited by examiner

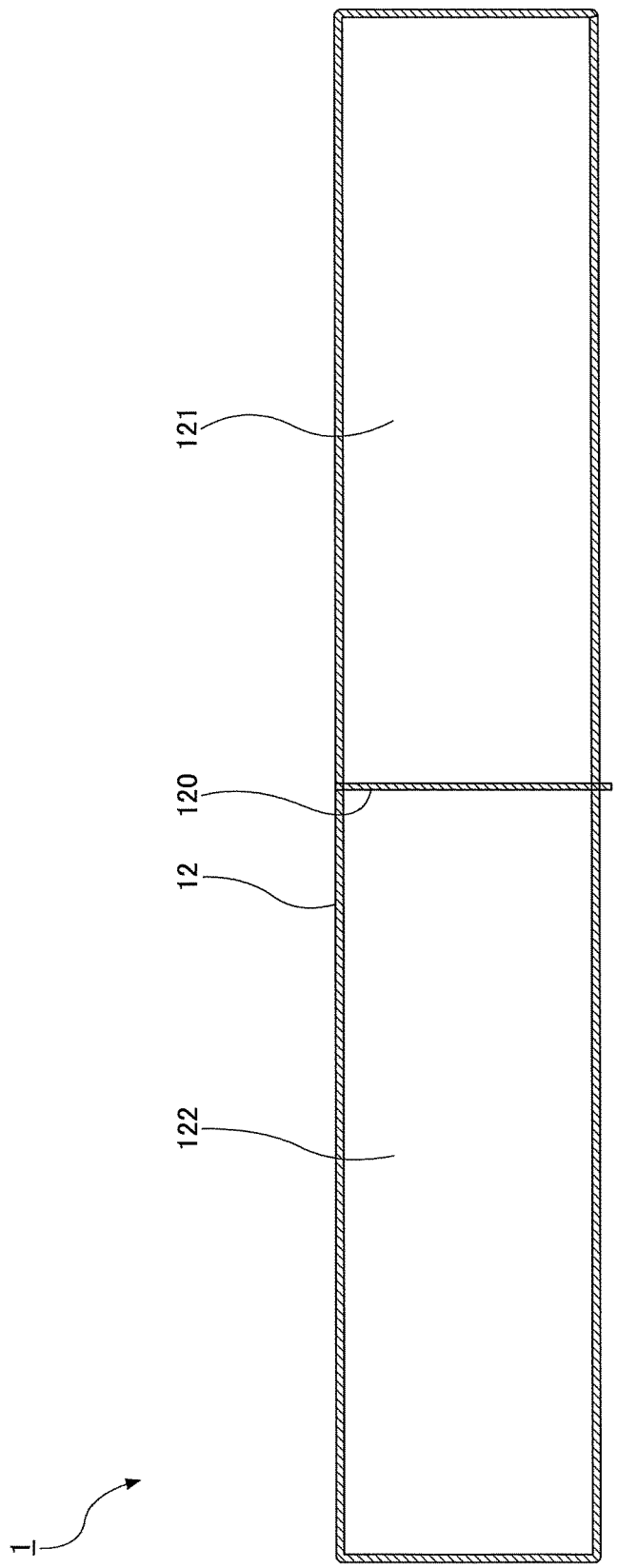

INFORMATION PROCESSING APPARATUS AND HEAT EXCHANGER

CROSS-REFERENCE TO RELATED APPLICATIONS

This present application is based upon and claims the benefit of priority of the prior Japanese Patent Application No. 2016-207218, filed on Oct. 21, 2016, the entire contents of which are incorporated herein by reference.

FIELD

The disclosure is related to an information processing apparatus and a heat exchanger.

BACKGROUND

A heat exchanger is known in which coolant channels and liquid channels are layered alternatively. Related art is disclosed in Japanese Unexamined Utility Model Application Publication No. 4-138571 and Japanese Laid-open Patent Publication No. 10-047884, for example.

However, according to prior art as described above, it is difficult to assure heat exchange between the coolants as well as heat exchange between the heat exchanger and air.

SUMMARY

An information processing apparatus is disclosed, which includes: a first heat emitting device; and a heat exchanger configured to exchange heat generated from the first heat emitting device, wherein the heat exchanger include a first layered structure of layers of a plurality of first flow channel members, each of the first flow channel members having one or more first flow channels formed therein for a first coolant that is liquid, a first header in fluid communication with the first flow channel members, a second layered structure of layers of a plurality of second flow channel members, each of the second flow channel members having one or more second flow channels formed therein for a second coolant that is liquid, and a second header in fluid communication with the second flow channel members, the first layered structure and the second layered structure are overlapped in a first region when viewed in a layered direction, and at least one of the first layered structure and the second layered structure has space between layers in a second region different from the first region.

The object and advantages of the embodiment will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 2C is a cross sectional view taken along a line C-C of FIG. 2A.

DESCRIPTION OF EMBODIMENTS

In the following, embodiments are described in detail with reference to appended drawings.

First Embodiment

Figure 1:
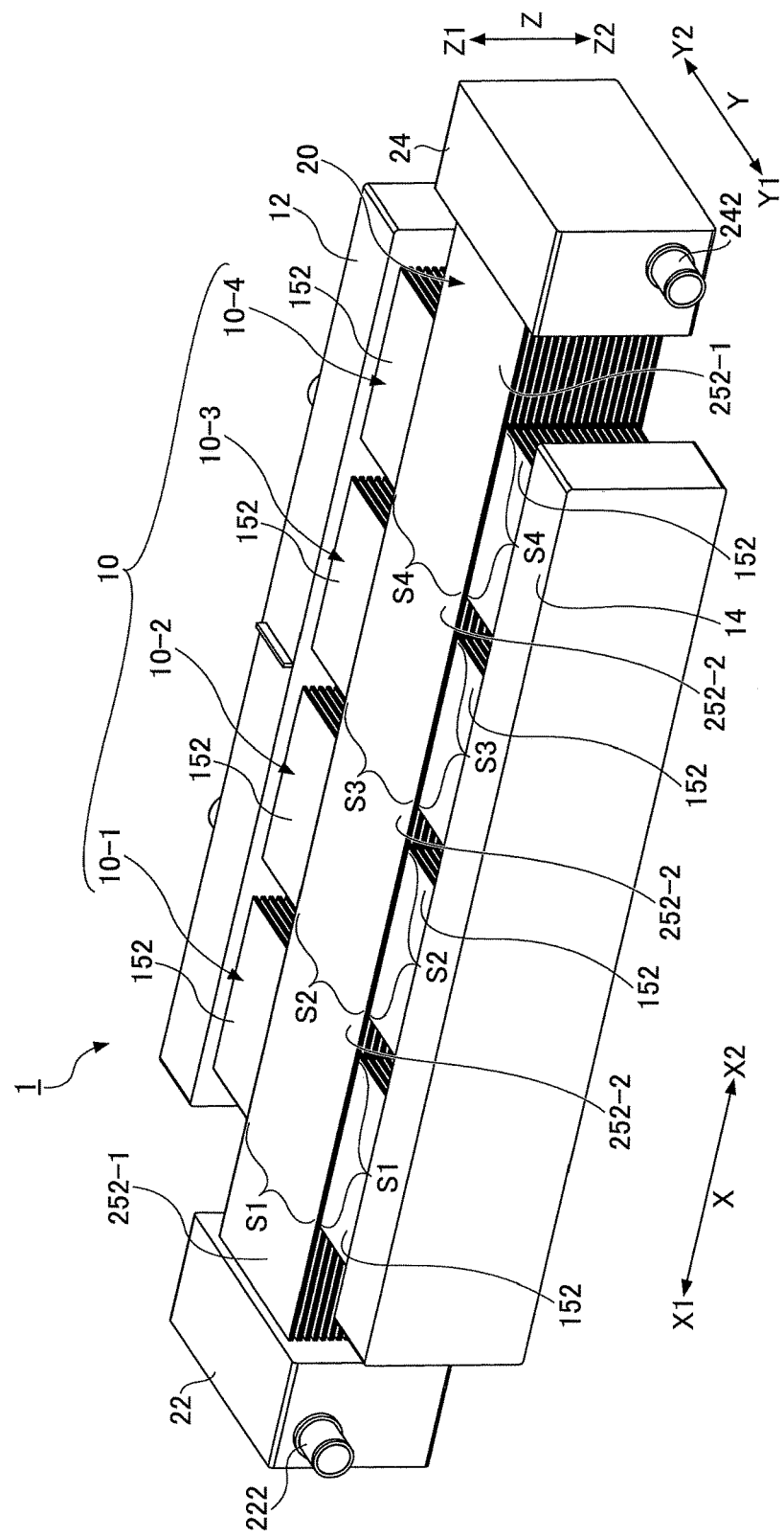
FIG. 1 is a perspective view of a heat exchanger according to a first embodiment.
Figure 2A:
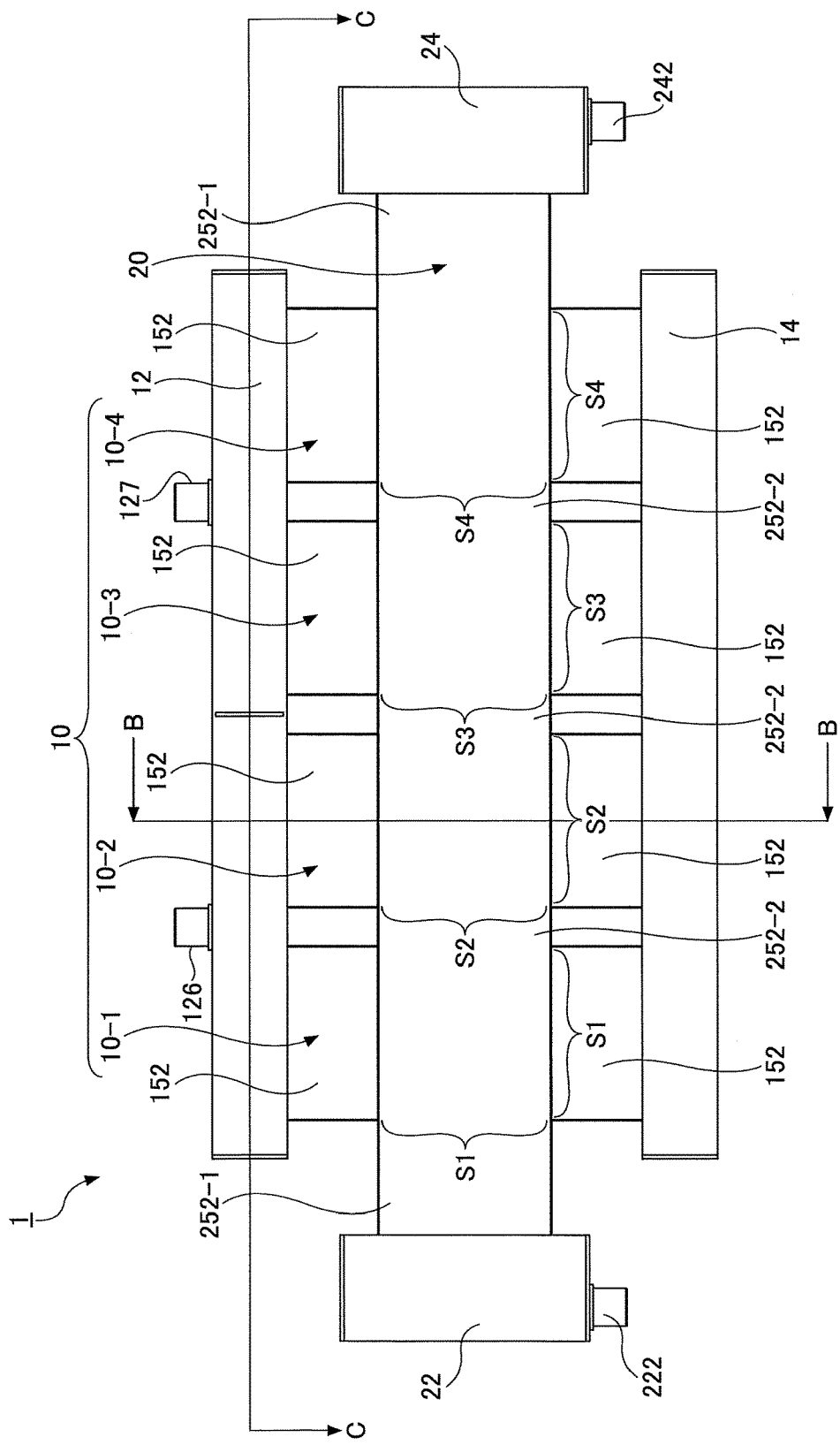
FIG. 2A is a plan view of the heat exchanger according to the first embodiment.
Figure 2B:
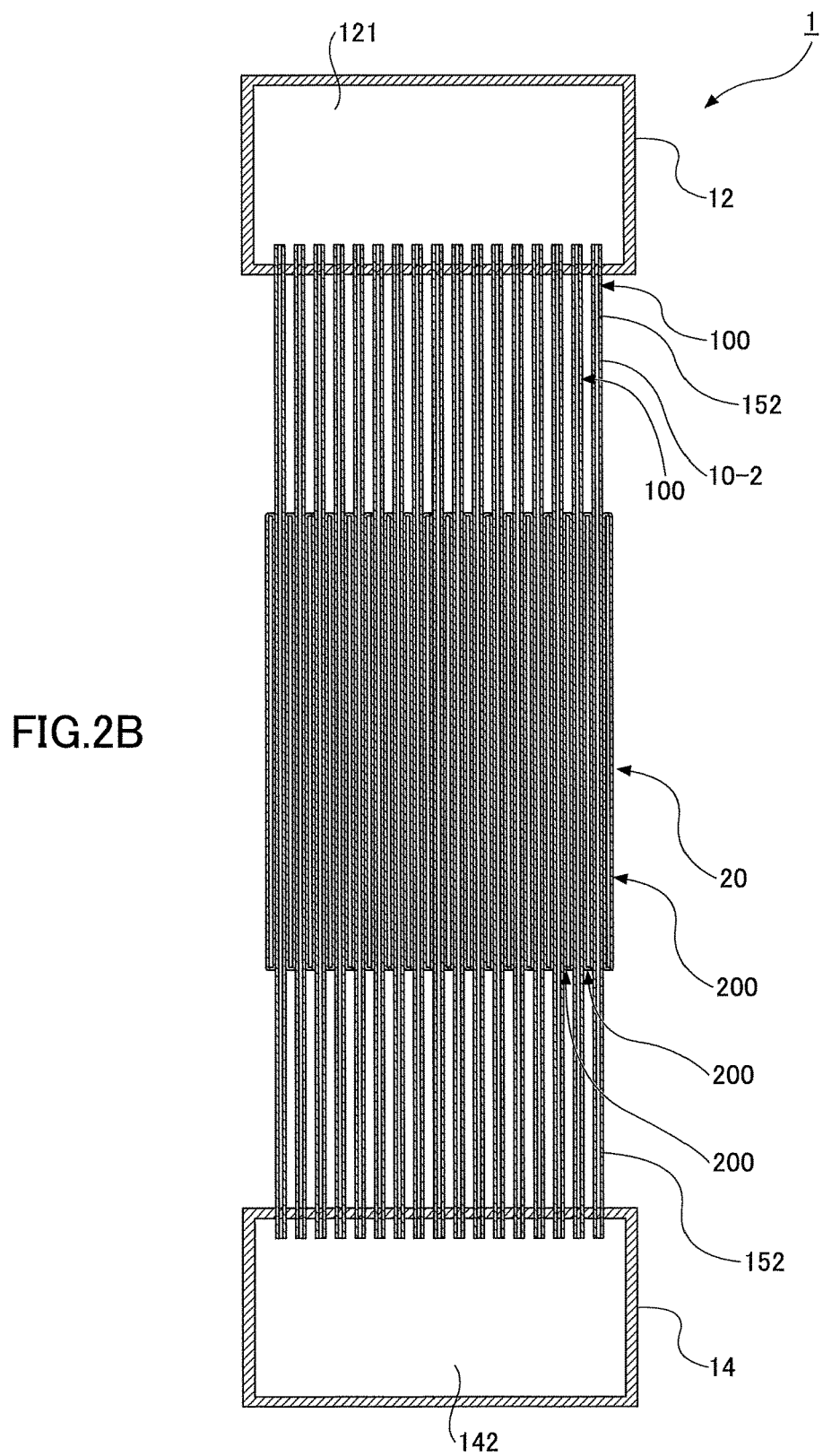
FIG. 2B is a cross sectional view taken along a line B-B of FIG. 2A.
Figure 3:
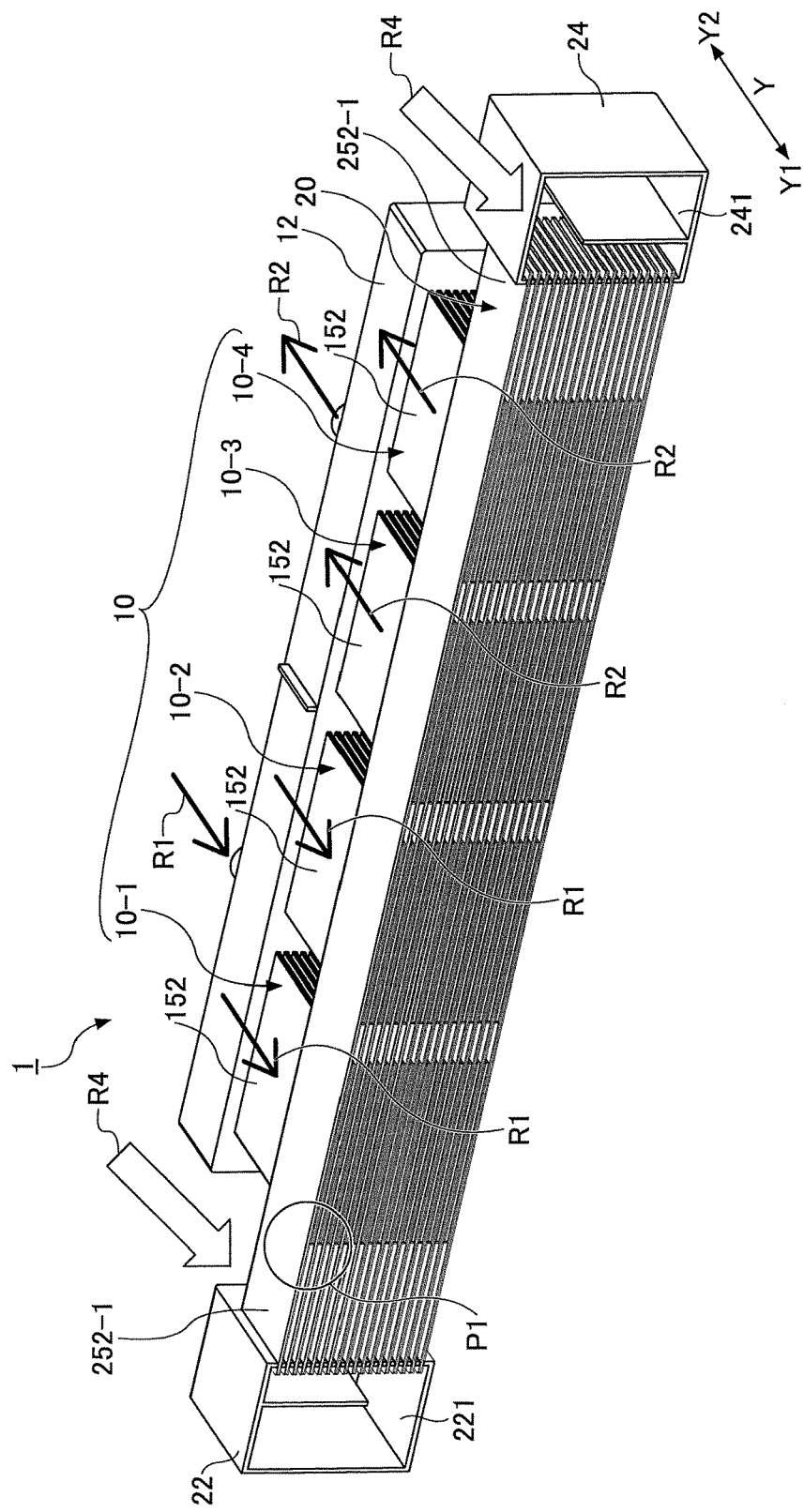
FIG. 3 is a diagram explaining a flow of a refrigerant.
Figure 4:
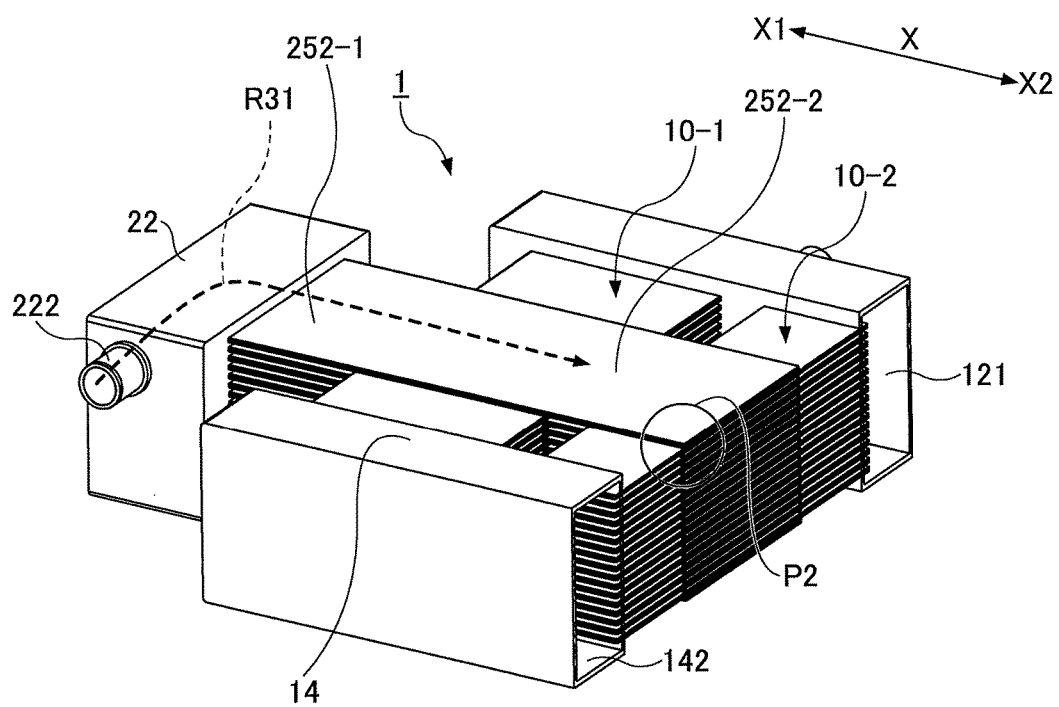
FIG. 4 is a diagram explaining a flow of a refrigerant.
Figure 5:
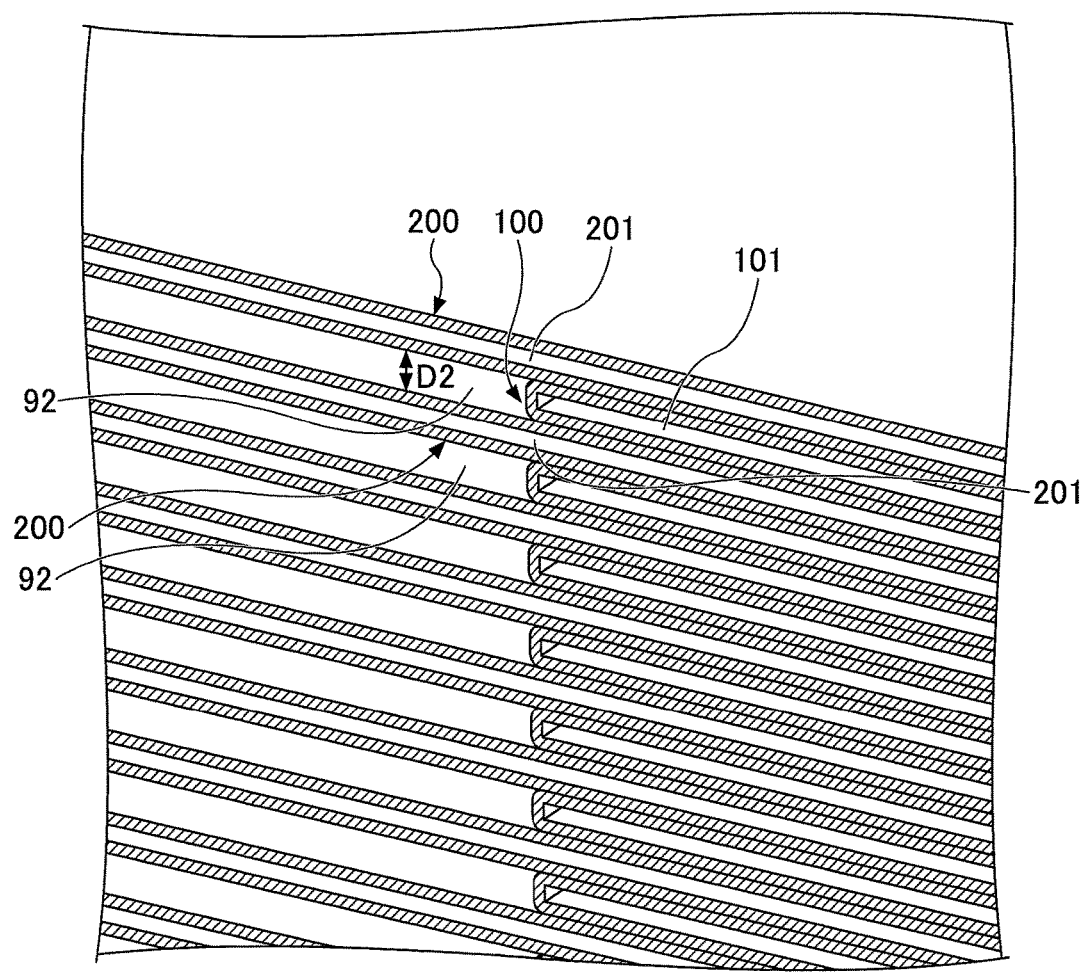
FIG. 5 is an enlarged view of a portion P1 of FIG. 3.
Figure 6:
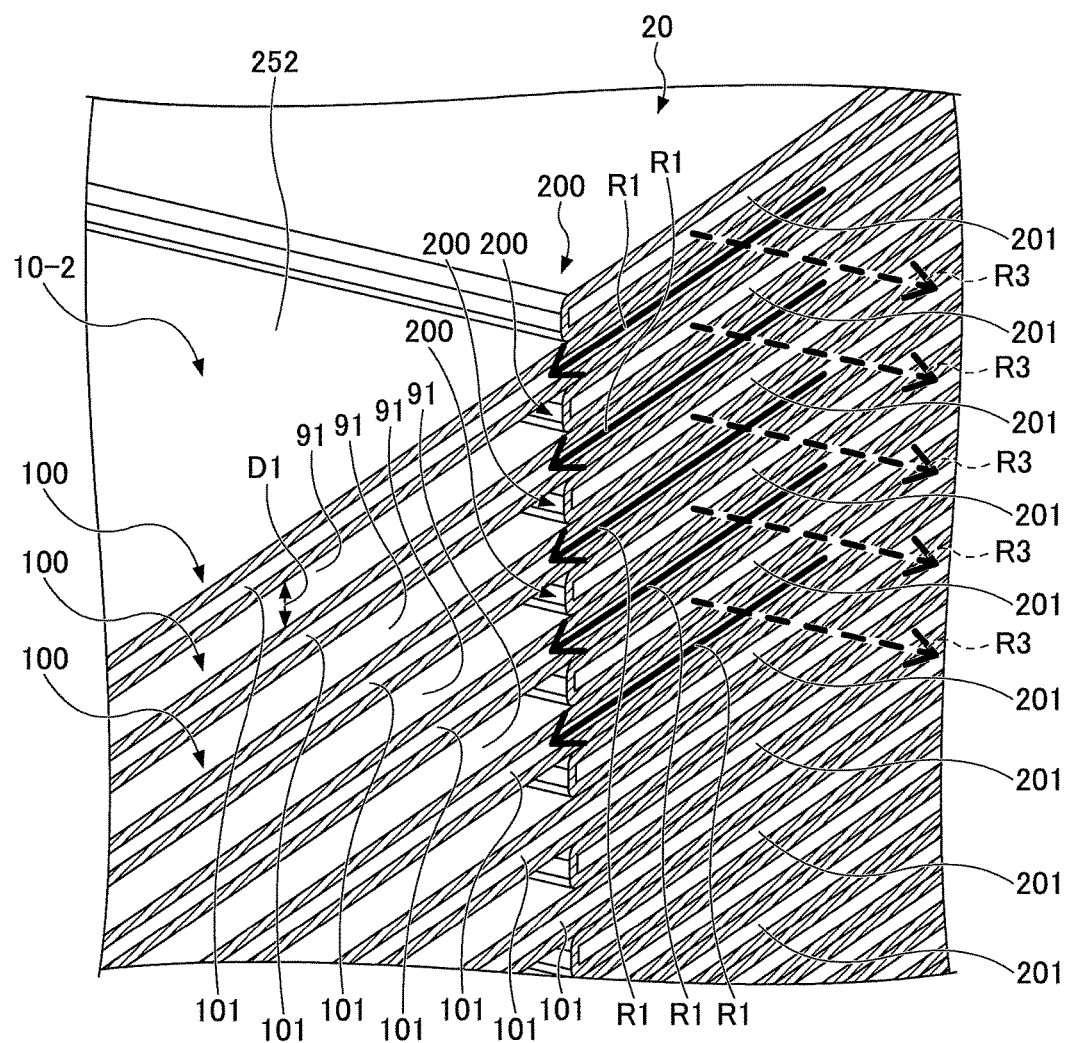
FIG. 6 is an enlarged view of a portion P2 of FIG. 4.

FIG. 1 is a perspective view of a heat exchanger 1 according to a first embodiment. In the following, for the sake of an explanation, as illustrated in FIG. 1, three orthogonal axes, X-axis, Y-axis, and Z-axis are defined. Here, as an example, it is assumed that the XY plane is a horizontal plane, the Z direction is the height direction, and the Z1 side is the upper side. FIG. 2A is a plan view of the heat exchanger 1, FIG. 2B is a cross sectional view taken along the line B-B of FIG. 2A, and FIG. 2C is a cross sectional view taken along the line C-C of FIG. 2A. FIG. 3 is a view illustrating a state in which a part of the heat exchanger 1 of FIG. 1 is cut off (a half cut along the XZ plane at the center position in the Y direction), FIG. 4 is a view illustrating the state of the heat exchanger 1 with a part thereof cut away (a part cut away along the YZ plane). FIG. 5 is an enlarged view of a portion P1 of FIG. 3. FIG. 6 is an enlarged view of a portion P2 of FIG. 4. In FIGS. 3 and 4, arrows R1 to R4 schematically indicate a flowing direction of a refrigerant or the like.

The heat exchanger 1 includes a primary layered structure 10, a header 12, 14 (an example of a first header), a secondary layered structure 20, a header 22, 24 (an example of a second header). Heat exchange between the primary layered structure 10 for the primary refrigerant and the secondary layered structure 20 for the secondary refrigerant is implemented between the primary refrigerant and the secondary refrigerant.

The primary layered structure 10 extends in the Y direction. A plurality of the primary layered structures 10 are provided at intervals in the X direction. In the example illustrated in FIG. 1, four primary layered structures 10 are provided at intervals in the X direction. Hereinafter, when describing one specific primary layered structure 10, reference numerals are assigned such as primary layered structures 10-1, 10-2, 10-3, and 10-4.

Each primary layered structure 10, as illustrated in FIGS. 1 and 6, includes a plurality of primary flow channel members 100 (examples of first flow channel members) layered in the Z direction. A layered structure in the Z direction of the plurality of primary flow channel members 100 is described in detail later.

The plurality of primary flow channel members 100 are formed of a material having high thermal conductivity. A plurality of primary channel members 100 have first flow channels 101 (examples of first flow channels) for the primary refrigerant formed therein, as illustrated in FIGS. 5 and 6. The first flow channels 101 extend in the Y direction. The plurality of primary channel members 100 each have the same form which is a flat tube form whose height in the Z direction is small. The plurality of primary flow channel members 100 in each primary layered structure 10 extend in the XY plane such that the primary flow channel members 100 are spaced by a predetermined distance D1 (see FIG. 6) in the Z direction.

The headers 12, 14 are respectively provided at opposite ends in the Y direction of the plurality of primary layered structures 10.

The header 12 is provided on the Y2 side in the Y direction of the plurality of primary layered structures 10. The header 12 may be separately provided for each of the plurality of primary layered structures 10, but in the present embodiment, as an example, the header 12 is commonly provided for a plurality of primary layered structures 10. Further, the header 12 has a partition plate 120 (see FIG. 2C) to have two partitioned chambers 121, 122. The partition plate 120 separates the chambers 121, 122 and enables the flow of the primary refrigerant in two directions (R1, R2 in FIG. 3) in the header 12. The chambers 121, 122 extend over the entire layered area of the plurality of primary flow channel members 100 in the Z direction, as illustrated in FIG. 2C.

The chamber 121 is commonly in fluid communication with each of the plurality of primary flow channels 101 related to the primary layered structure 10-1 and is commonly in fluid communication with each of the plurality of primary flow channels 101 of the primary layered structure 10-2. The chamber 122 is commonly in fluid communication with each of the plurality of primary flow channels 101 related to the primary layered structure 10-3 and is commonly in fluid communication with each of the plurality of primary flow channels 101 of the primary layered structure 10-4.

The header 12 is coupled to a cooling apparatus such as a chiller (not illustrated). The header 12 has coupling portions 126, 127 on the Y2 side surface in the Y direction to which piping (not illustrated) can be coupled. The header 12 can be coupled to the cooling apparatus via the piping. In the present embodiment, as an example, the chamber 121 of the header 12 has a function of distributing and supplying the primary refrigerant supplied from the cooling apparatus to each of the plurality of primary flow channels 101. That is, the chamber 121 has a function of storing the primary refrigerant to be introduced into the primary flow channels 101 of the primary layered structure 10-1 and the primary layered structure 10-2 to distribute the stored primary refrigerant to each of the primary flow channels 101 of the primary layered structure 10-1 and the primary layered structure 10-2. The primary refrigerant from the chamber 121 flows through the primary flow channels 101 of the primary layered structure 10-1 and the primary layered structure 10-2 to the Y1 side in the Y direction (see R1 in FIGS. 3 and 6). On the other hand, the chamber 122 has a function of converging the primary refrigerant flowing out from each of the primary flow channels 101 of the primary layered structure 10-3 and the primary layered structure 10-4 to return the primary refrigerant to the cooling apparatus. The primary refrigerant to the chamber 122 flows through the primary flow channels 101 of the primary layered structure 10-3 and the primary layered structure 10-4 to the Y2 side in the Y direction (see R2 in FIG. 3).

The header 14 is commonly provided for the plurality of primary layered structures 10. As illustrated in FIG. 4, the header 14 has a chamber 142 which is commonly in fluid communication with each of the primary flow channels 101 of the plurality of primary flow channel members 100. The chamber 142 extends over the entire layered area of the plurality of primary flow channel members 100 in the Z direction. That is, the chamber 142 has a function of collecting the primary refrigerant from the primary flow channels 101 of the primary layered structure 10-1 and the primary layered structure 10-2 to distribute the collected primary refrigerant to each of the primary flow channels 101 of the primary layered structure 10-3 and the primary layered structure 10-4.

The secondary layered structure 20 extends in the Y direction. Each secondary layered structure 20, as illustrated in FIGS. 1 and 6, includes a plurality of secondary flow channel members 200 (examples of second flow channel members) layered in the Z direction.

Like the above-described primary flow channel member 100, the plurality of secondary flow channel members 200 are formed of a material having high thermal conductivity, and each have secondary flow channels 201 for the secondary refrigerant formed therein (examples of second flow channels), as illustrated in FIGS. 5 and 6. The plurality of secondary flow channel members 200 extend in the X direction. The plurality of secondary channel members 200 each have the same flat tube form. The plurality of secondary flow channel members 200 each extend in the XY plane such that the secondary flow channel members 200 are spaced by a predetermined distance D2 (see FIG. 5) in the Z direction.

The primary layered structures 10 and the secondary layered structure 20 partially have overlapping (intersecting) ranges in a top view (in a layered direction view). In the following, in top view, a range (an example of a first range) in which the primary layered structure 10 and the secondary layered structure 20 are overlapped is referred to as "intersecting range", a range (an example of a second range) in which the primary layered structure 10 and the secondary layered structure 20 are not overlapped is referred to as "non-intersecting range". In the example illustrated in FIG. 1, an intersecting range S1 between the secondary layered structure 20 and the primary layered structure 10-1 and an intersecting range S2 between the secondary layered structure 20 and the primary layered structure 10-2 are illustrated. Further, an intersecting range S3 between the secondary layered structure 20 and the primary layered structure 10-3 and an intersecting range S4 between the secondary layered structure 20 and the primary layered structure 10-4 are illustrated. Here, portions of the primary layered structure 10 and the secondary layered structure 20, which are located in the non-intersecting range in top view, are referred to as first non-intersecting portion 152 and second non-intersecting portion 252-1, 252-2", respectively. It is noted that FIG. 6 is an enlarged view of a portion (P2) including the intersection range S2 between the secondary layered structure 20 and the primary layered structure 10-2.

In each of the intersecting ranges S1 to S4, the plurality of secondary flow channel members 200 are layered in the Z direction via corresponding one of the plurality of primary flow channel members 100. That is, each of the plurality of secondary flow channel members 200 and each of the plurality of primary flow channel members 100 are alternately layered in the Z direction. In each of the intersecting ranges S1 to S4, each primary flow channel member 100 and each secondary flow channel member 200 adjacent to each other in the Z direction are preferably in surface contact with each other in the Z direction. In this case, the height of each primary flow channel member 100 corresponds to the predetermined distance D2 between the plurality of secondary flow channel members 200 in the Z direction, and the height of each secondary flow channel member 200 corresponds to the predetermined distance D1 between the plurality of primary flow channel members 100 in the Z direction. With this arrangement, it becomes possible to increase the efficiency of heat exchange between the primary refrigerant and the secondary refrigerant. It is noted that a contact assisting material such as a brazing material or a thermal grease may be applied to each contact surface between the primary flow channel members 100 and the secondary flow channel members 200 adjacent in the Z direction.

On the other hand, the primary layered structures 10 have spaces 91 (see FIG. 6) between the layers of the plurality of primary flow channel members 100 in each non-intersecting range related to the primary layered structures 10. That is, in the non-intersecting ranges related to the primary layered structures 10, the primary layered structures 10 have the spaces 91 between neighboring primary flow channel members 100 in the Z direction. It is noted that the height of the space 91 corresponds to the predetermined distance D1. In the example illustrated in FIG. 1, the non-intersecting ranges relating to the primary layered structures 10 extend in the Y direction between the header 12 and the secondary layered structure 20 and between the secondary layered structure 20 and the header 14, respectively. That is, the primary layered structures 10 each have the first non-intersecting portions 152 at opposite ends in the Y direction. It is noted that such first non-intersecting portions 152 are provided for each of the primary layered structures 10-1 to 10-4. Since these first non-intersecting portions 152 have the spaces 91 between the layers, air can pass in the X direction and the efficiency of heat exchange can be increased. This point is described in detail later.

Similarly, the secondary layered structure 20 has spaces 92 (see FIG. 5) between the layers of the plurality of secondary flow channel members 200 in each non-intersecting range related to the secondary layered structure 20. That is, in the non-intersecting ranges related to the secondary layered structure 20, the secondary layered structure 20 has the spaces 92 between neighboring secondary flow channel members 100 in the Z direction. It is noted that the height of the space 92 corresponds to the predetermined distance D2. In the example illustrated in FIG. 1, the non-intersecting ranges relating to the secondary layered structure 20 extend in the X direction between the header 22 and the primary layered structure 10-1 and between the primary layered structure 10-4 and the header 24, respectively. That is, the secondary layered structure 20 has the second non-intersecting portions 252-1 at opposite ends in the X direction. In addition, the non-intersecting ranges related to the secondary layered structure 20 extend in the X direction between the primary layered structures 10-1 and 10-2, between the primary layered structures 10-2 and 10-3, and between the primary layered structure 10-3 and 10-4, respectively. That is, the secondary layered structure 20 has the second non-intersecting portion 252-2 in the X direction between (three places) the primary layered structures 10-1 to 10-4. Since these secondary non-intersecting portions 252-1, 252-2 have the spaces 92 between the layers, air can pass in the Y direction and the efficiency of heat exchange can be increased. This point is described in detail later.

The headers 22, 24 are respectively provided at opposite ends of the plurality of secondary flow channel members 200 in the X direction.

As illustrated in FIG. 3, the header 22 has a chamber 221 which is commonly in fluid communication with each of the secondary flow channels 201 of the plurality of secondary flow channel members 200. The chamber 221 extends over the entire layered area of the plurality of secondary flow channel members 200 in the Z direction. The header 22 has the circulating secondary refrigerant introduced therein (see the arrow R31 in FIG. 4). In this embodiment, as an example, as illustrated in FIG. 1, the header 22 has a coupling portion 222 on the inlet side provided at the upper portion in the Z direction on the side surface on the Y1 side in the Y direction. Piping (see piping 2221 in FIG. 7) can be coupled to the coupling portion 222, and the piping is arranged so as to pass through a heat emitting element (described later). The header 22 has a function of supplying and distributing the secondary refrigerant, which is introduced into the chamber 221, to each of the plurality of secondary flow channels 201. That is, the header 22 has a function of storing the secondary refrigerant to be introduced into the plurality of secondary flow channels 201 to distribute the stored secondary refrigerant to each of the plurality of secondary flow channels 201.

As illustrated in FIG. 3, the header 24 has a chamber 241 which is commonly in fluid communication with each of the secondary flow channels 201 of the plurality of secondary flow channel members 200. The chamber 241 extends over the entire layered area of the plurality of secondary flow channel members 200 in the Z direction. From the header 24, the secondary refrigerant is returned in a direction toward the heat emitting element (described later). In this embodiment, as an example, as illustrated in FIG. 1, the header 24 has a coupling portion 242 on the outlet side provided at the lower portion in the Z direction on the side surface on the Y1 side in the Y direction. Piping (not illustrated) can be coupled to the coupling portion 242, and the piping is arranged so as to pass through the heat emitting element (described later). The header 24 has a function of collecting the secondary refrigerant flowing out from the plurality of secondary flow channels 201 to return the collected secondary refrigerant to the heat emitting element (described later) (see an arrow R 32 in FIG. 7).

Next, referring again to FIGS. 3 to 5, the heat exchange function of the heat exchanger 1 is described.

As illustrated in FIG. 3, the primary refrigerant flows through the primary flow channel members 100 in the primary layered structures 10-1 and 10-2 to the Y1 side in the Y direction, is turned back at the header 14, and flows through the primary flow channel members 100 in the primary layered structures 10-3 and 10-4 to the Y2 side. The primary refrigerant in the primary layered structure 10 can realize the heat exchange with the secondary refrigerant in the secondary layered structure 20 in the intersecting ranges. Specifically, the primary refrigerant in the primary layered structure 10 cools the secondary refrigerant by removing the heat of the secondary refrigerant in the secondary layered structure 20 in the intersecting ranges.

Further, the primary layered structure 10 can realize the heat exchange with the air in the spaces 91 in each non-intersecting range (see the first non-intersecting portion 152 in FIG. 3) related to the primary layered structures 10. For example, the primary refrigerant in the primary layered structure 10 cools the air in the spaces 91 by removing the heat of the air in the spaces 91 in each non-intersecting range related to the primary layered structures 10. Alternatively, the primary refrigerant in the primary layered structures 10 is cooled by being deprived of heat by the air in the spaces 91 in each non-intersecting range related to the primary layered structures 10. In this way, in the primary layered structure 10, it becomes possible to implement the heat exchange with the second refrigerant in the intersection ranges as well as heat exchange with the air in the non-intersecting ranges. It is noted that the air in the spaces 91 can flow to the heat emitting element (described later) with a fan, for example. As a result, air-cooling of the heat emitting element is enabled.

As illustrated in FIGS. 4 and 6, the secondary refrigerant flows through the secondary flow channel members 200 in the secondary layered structure 20 to the X2 side in the X direction (see arrows R31 in FIG. 4 and arrows R3 in FIG. 6). The secondary refrigerant in the secondary layered structure 20 can realize the heat exchange with the primary refrigerant in the primary layered structures 10 in the intersecting ranges, as described above. Specifically, the secondary refrigerant in the secondary layered structure 20 is deprived of heat by the primary refrigerant in the primary layered structure 10 in the intersecting ranges. As a result, the secondary refrigerant that has been cooled by the primary refrigerant can flow toward the heat emitting element. Further, for example, by increasing the number of the primary layered structures 10, since the intersection ranges are increased, the heat exchange capacity of the heat exchanger 1 (between the primary refrigerant and the secondary refrigerant) can be easily increased without increasing the height of the heat exchanger 1.

Further, the secondary layered structure 20 can realize the heat exchange with the air in the spaces 92 described above in the non-intersecting ranges related to the secondary layered structure 20. For example, the secondary refrigerant in the secondary layered structure 20 is cooled by being deprived of heat by the air in the spaces 92 in each non-intersecting range (see the second non-intersecting portion 252-1, 252-2 in FIG. 4) related to the secondary layered structure 20. In this way, in the secondary layered structure 20, it becomes possible to implement the heat exchange with the primary refrigerant in the intersection ranges as well as the heat exchange with the air in the non-intersecting ranges. Also, when the air cooled in the non-intersecting ranges related to the primary layered structure 10 passes through the space 92 as described above, the cooling efficiency of the secondary refrigerant in the non-intersecting ranges related to the secondary layered structure 20 can be efficiently increased.

Next, an example of an information processing apparatus 60 including the heat exchanger 1 is described with reference to FIG. 7.

Figure 7:
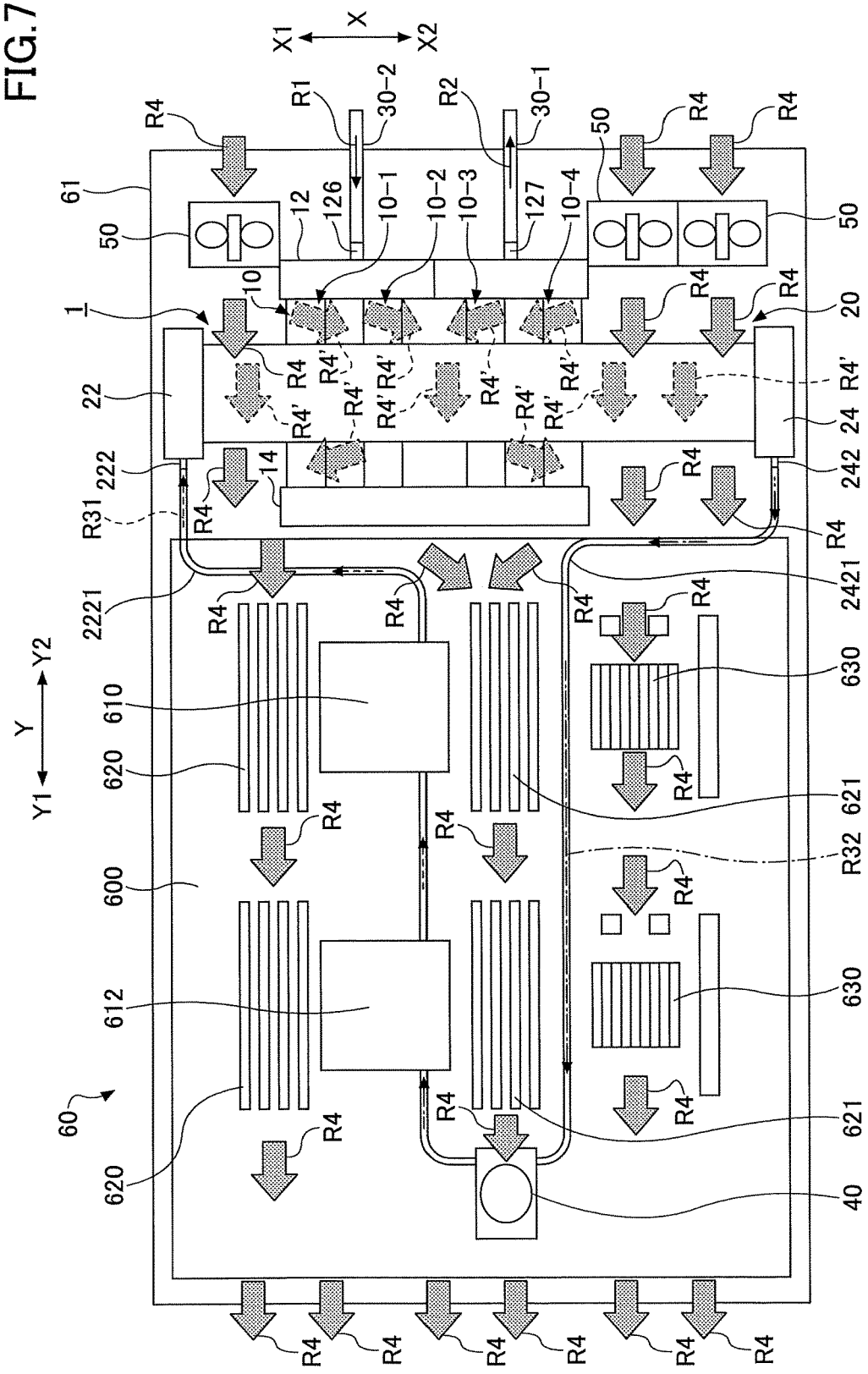
FIG. 7 is a diagram schematically illustrating an example of an information processing apparatus according to a first embodiment.

FIG. 7 is a diagram schematically illustrating an example of the information processing apparatus 60. FIG. 7 schematically illustrates an internal structure of the information processing apparatus 60.

The information processing apparatus 60 may be in the form of a server, or may be in the form of other electronic devices. In the example illustrated in FIG. 7, the information processing apparatus 60 is in the form of a server. In FIG. 7, a structure in an unit case 61 of the server is illustrated schematically. The server has a chassis (not illustrated) in the form of a rack or shelf capable of storing a plurality of such unit cases.

The unit case 61 accommodates a substrate 600 together with the heat exchanger 1. The substrate 600 has the heat emitting element installed thereon. The heat emitting element is arbitrary. The heat emitting element may be a CPU (Central Processing Unit), an LSI (Large-Scale Integration), a PSU (Power Supply Unit), a hard disk drive (HDD) or the like. In the example illustrated in FIG. 7, on the substrate 600, as an example of a heat emitting element, CPUs 610,612 (an example of the first heat emitting element), memory devices 620, 621 (an example of a second heat emitting element), a power supply 630 (an example of a second heat emitting element), etc., are mounted.

The unit case 61 has the substrate 600 provided on the Y1 side in the Y direction, and has the heat exchanger 1 provided on the Y2 side in the Y direction. It is noted that the Y1 side may be on the back side of the server (the side opposite to the side from which the unit case 61 is taken in and out), or may be on the front side of the server. Further, in the case of a variant in which the unit case 61 is vertically placed, the X direction in FIG. 7 may be replaced with the Z direction.

A pump 40 is provided in the unit case 61. The pump 40 generates power for circulating the secondary refrigerant. In the example illustrated in FIG. 7, the pump 40 is coupled to piping 2221 and 2421, the piping 2221 is coupled to the coupling portion 222 of the header 22, and the piping 2421 is coupled to the coupling portion 242 of the header 24. The piping 2221 and 2421 are provided so as to pass through the heat emitting element. In this case, the piping 2221 and the piping 2421 may include a flow channel formed in a heat receiving portion (for example, a heat sink) that is thermally coupled to the heat emitting element. In the example illustrated in FIG. 7, the piping 2221 includes a flow channel in the heat receiving portion of the CPUs 610,612. As a result, it is possible to efficiently cool the heat emitting element having a relatively large amount of heat generation.

Fans 50 are provided in the unit case 61. The fans 50 generate a flow of air along the Y direction in the XY plane (along the surface on the Z1 side of the substrate 600). For example, rotation axes of the fans 50 extend parallel to the Y direction, but the rotation axes may be slightly inclined with respect to the Y direction. In FIG. 7, the flow of air generated by the fan 50 is schematically illustrated by arrows R4 and R4'. The arrows R4' represent the flow of air through the spaces 91 of the primary layered structures 10 or the spaces 92 of the secondary layered structure 20. It is noted that, in the example illustrated in FIG. 7, the fans 50 are provided on the upstream side (i.e., the Y2 side) of the air flow, but this is not indispensable. For example, the fan 50 may be provided on the downstream side (i.e., Y1 side) of the air flow.

The fans 50 can generate the flow of air through the spaces 91 of the primary layered structure 10 or the spaces 92 of the secondary layered structure 20, as indicated by arrows R4' in FIG. 7. As a result, the air flowing to the downstream side (i.e., the Y1 side) through the heat exchanger 1 can be generated. As illustrated in FIG. 7, the air flowing through the heat exchanger 1 to the downstream side (i.e., the Y1 side) flows along the substrate 600 and can cool the heat emitting elements on the substrate 600. That is, it is possible to realize air cooling of heat emitting elements which are not water-cooled on the substrate 600. For example, in the example illustrated in FIG. 7, the air flowing to the downstream side through the heat exchanger 1 can cool the memory 620 and the power supply 630 when flowing over the substrate 600. Further, the air flowing to the downstream side through the heat exchanger 1 can cool the CPUs 610,612. Thus, both air and water cooling for the CPUs 610,612, which are examples of heat emitting elements with a relatively large heating amount, can be realized. Hereinafter, the function of generating the air flow through the spaces 91 of the primary layered structure 10 or the spaces 92 of the secondary layered structure 20 to cool the heat emitting element is referred to as "air cooling function by air flow through the heat exchanger 1".

The fans 50 are preferably provided so as to face the spaces 92 of the secondary layered structure 20 in the Y direction in order to enhance the air cooling function by the air flow through the heat exchanger 1. Further, the rotation axes of the fans 50 are preferably parallel to the XY plane, and are perpendicular to the secondary flow channels 201 (extending in the X direction) in the non-intersecting ranges related to the secondary layered structure 20. This can reduce the loss of air flow in passing through the space 92.

Here, when a general plate type liquid-liquid heat exchanger is arranged in a unit case such as the unit case 61, the heat exchanger is required to be placed outside the case unit, because the air cannot flow into the unit case due to the heat exchanger if the heat exchanger is placed within the case unit.

In this respect, according to the information processing apparatus 60 of the embodiment, because the heat exchanger 1 has spaces 91 and 92 as described above, the flow of air passing through the spaces 91 and 92 can be generated even when the heat exchanger 1 is placed in the unit case 61. Thus, even when the heat exchanger 1 is placed in the unit case 61, it is possible to efficiently cool the heat emitting elements (e.g., the memory devices 620, 621, the power supply 630, etc.) in the unit case 61.

Further, according to the information processing apparatus 60 of the embodiment, the heat exchanger 1 includes the plurality of primary channel members 100 and the plurality of secondary flow channel members 200 that extend in a direction perpendicular to the Z direction to be in a substantially flat form. Therefore, it is possible to reduce the thickness while maintaining the high heat exchange capacity as described above. Thus, it is possible to efficiently reduce the dimension in the Z direction of the heat exchanger 1 while ensuring the necessary heat exchange capacity. As a result, even when the unit case 61 is relatively thin, the heat exchanger 1 can be mounted in the unit case 61.

It is noted that, in the example illustrated in FIG. 7, the heat emitting elements such as CPUs 610,612 are mounted on the surface of one side of the substrate 600 (Z1 side surface); however, this is not indispensable. The heat emitting elements may be mounted on the other surface of the substrate 600. In this case, the fans 50 generate a flow of air along the Y direction in the XY plane (along the surface on the Z2 side of the substrate 600). Alternatively, the heat emitting elements may be respectively mounted on the surfaces of both sides of the substrate 600. In this case, the fans 50 generate a flow of air along the Y direction in the XY plane (along the surfaces on the Z1 side and the Z2 side of the substrate 600).

Further, in the example illustrated in FIG. 7, the CPUs 610,612 are cooled via the heat exchanger 1; however, other heat emitting elements may be cooled through the heat exchanger 1.

Figure 8:
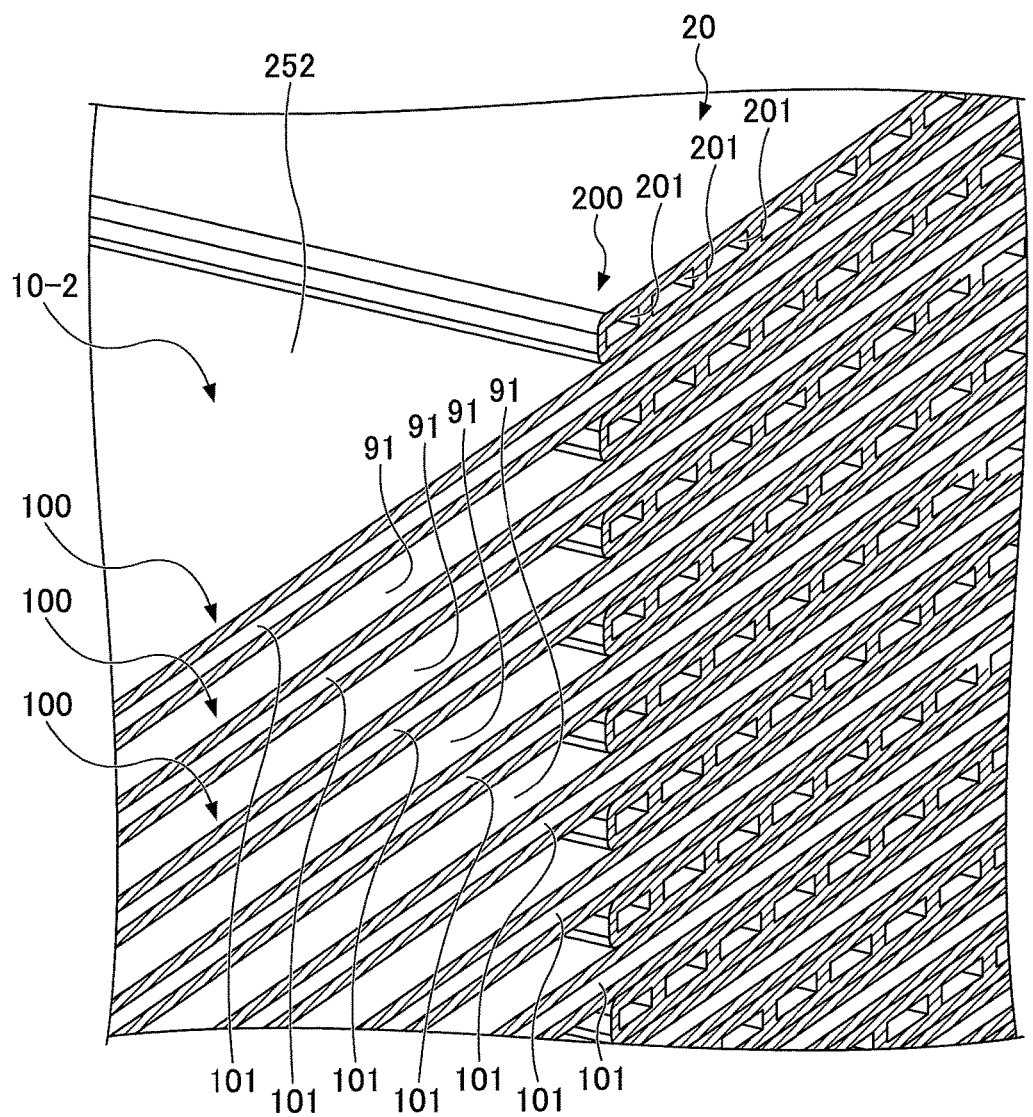
FIG. 8 is a diagram illustrating an example of a multi-hole tube.

It is noted that, according to the first embodiment described above, each of the plurality of secondary flow channel members 200 forms a single flow channel of closed cross section in a sectional view seen in the X-direction (i.e., in the form of a flat tube); however, this is not indispensable. For example, as illustrated in FIG. 8, each of the plurality of secondary flow channel members 200 may form a plurality of flow channels of closed cross section when viewed in the X direction. That is, each of the plurality of secondary flow channel members 200 may be a multi-hole tube. This also applies to the plurality of primary flow channel members 100. In the case of using a multi-hole flow channel member, the surface area increases compared with the case of using a single hole flow channel member, and thus efficient heat exchange can be realized.

Second Embodiment

Figure 9:
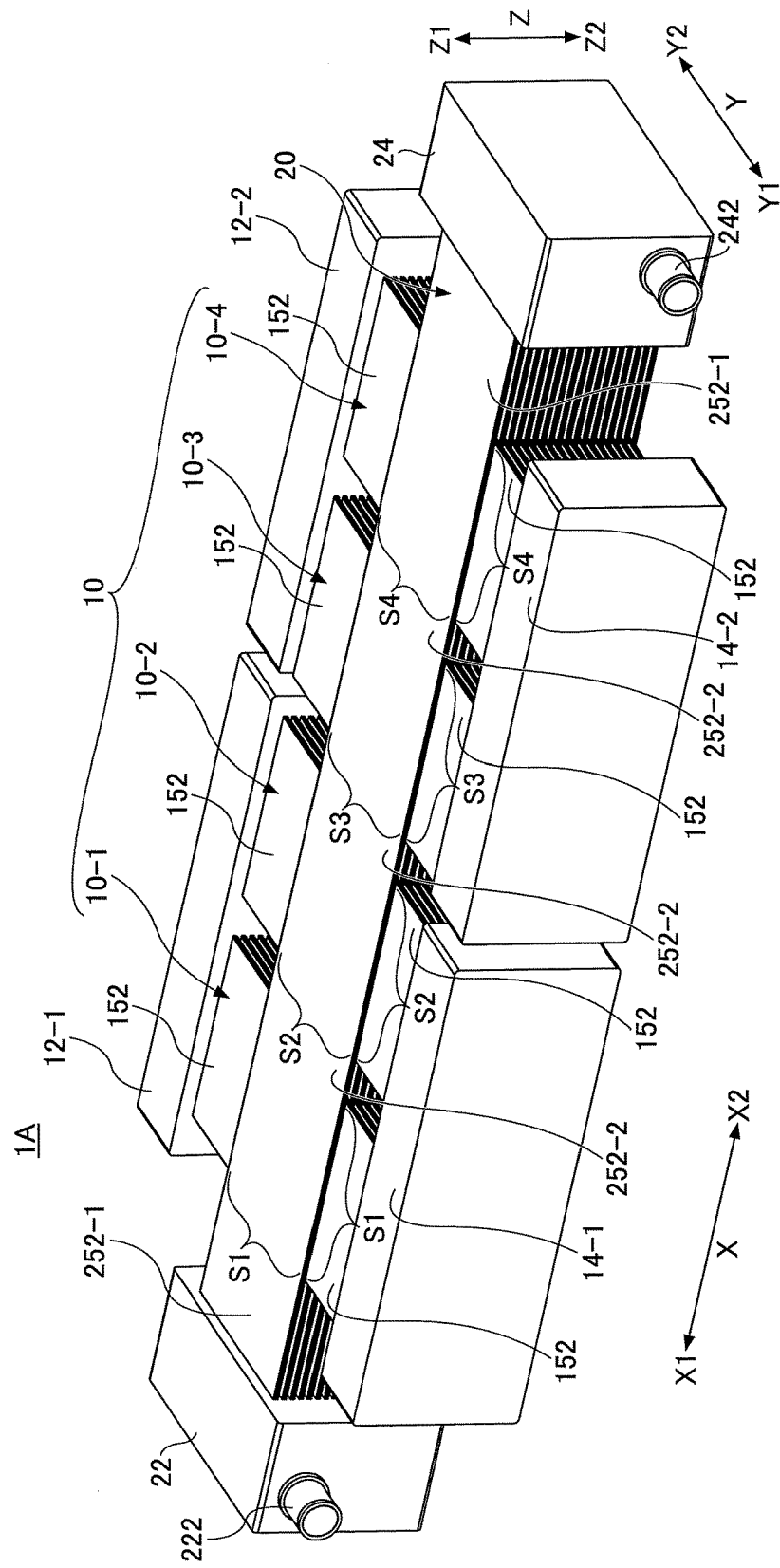
FIG. 9 is a perspective view of a heat exchanger according to a second embodiment.
Figure 10:
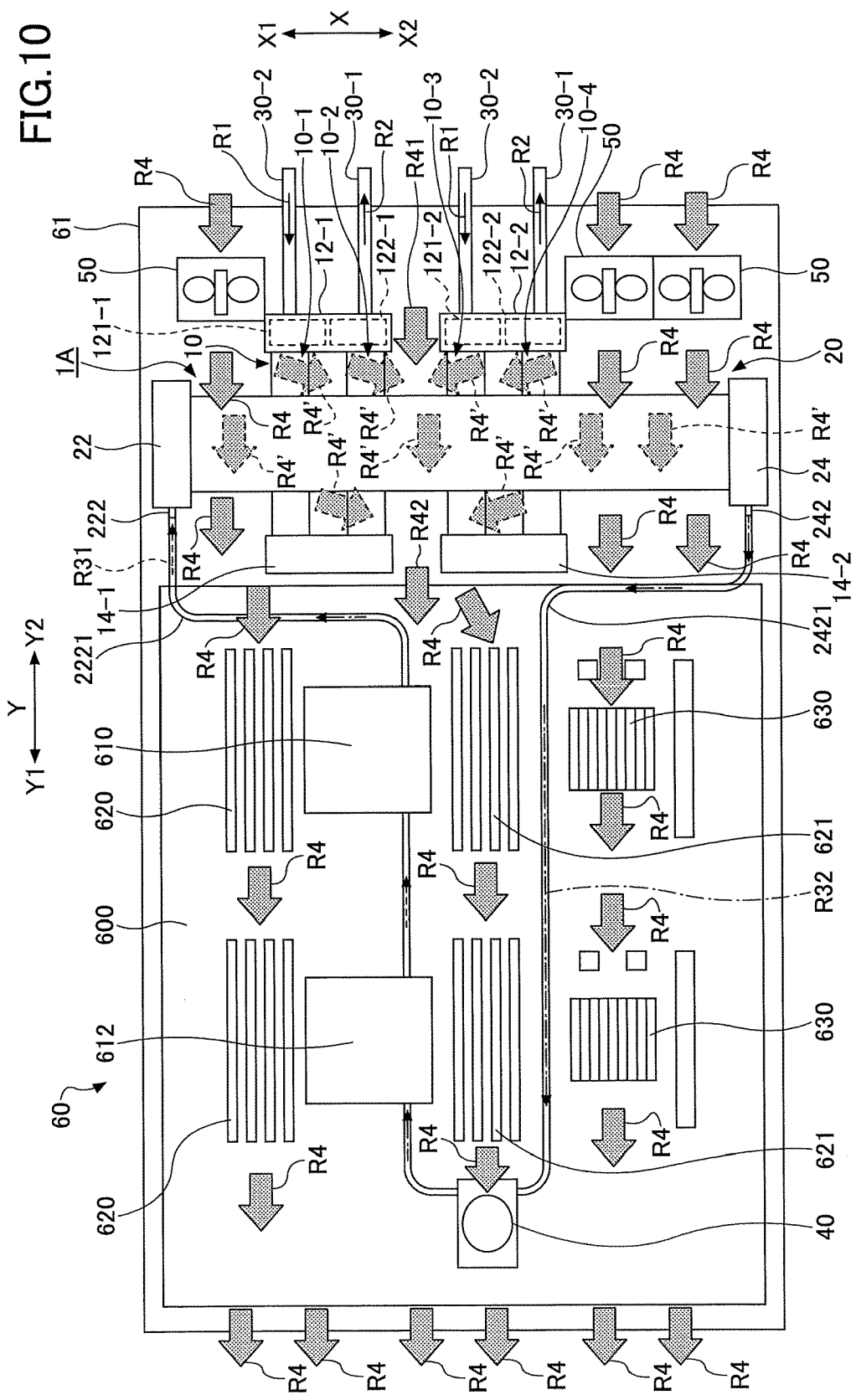
FIG. 10 is a diagram schematically illustrating an example of an information processing apparatus including the heat exchanger according to the second embodiment.

Next, with reference to FIGS. 9 and 10, a second embodiment is described. In the description of the second embodiment, elements different from the first embodiment described above are described, and other elements may be the same as those in the first embodiment.

FIG. 9 is a perspective view of a heat exchanger 1A according to the second embodiment. FIG. 10 is a plan view schematically illustrating an example of an information processing apparatus 60A including the heat exchanger 1A according to the second embodiment.

The heat exchanger 1A according to the second embodiment is different from the heat exchanger 1 according to the first embodiment in that the header 12 is divided into headers 12-1 and 12-2, and the header 14 is divided into headers 14-1 and 14-2. Accordingly, the flow of the primary refrigerant differs.

The primary layered structures 10-1 and 10-2 are coupled to the header 12-1 and the header 14-1, and the primary layered structures 10-3 and 10-4 are coupled to the header 12-2 and the header 14-2. The headers 12-1 and 12-2 are separated in the X direction and are not in fluid communication with each other. The headers 14-1 and 14-2 are separated in the X direction and are not in fluid communication with each other.

The header 12-1 has a side surface on the Y2 side in the Y direction to which two piping 30-1 and 30-2 (see FIG. 10) can be coupled, and the header 12-1 can be coupled to the cooling apparatus via the piping 30-1 and 30-2. The header 12-1 has a partition plate (not illustrated) similar to the header 12 according to the first embodiment described above and has two chambers 121-1, 122-1 separated from each other. The chamber 122-1 is in fluid communication with the piping 30-1 and the chamber 121-1 in fluid communication with the piping 30-2.

The chamber 121-1 is commonly in fluid communication with each of the plurality of primary flow channels 101 related to the primary layered structure 10-1. The chamber 122-1 is commonly in fluid communication with each of the plurality of primary flow channels 101 related to the primary layered structure 10-2. The header 14-1 is commonly in fluid communication with each of the plurality of primary flow channels 101 related to the primary layered structure 10-1 and each of the plurality of primary flow channels 101 related to the primary layered structure 10-2. The primary refrigerant flows through the primary flow channel members 100 of the primary layered structure 10-1 to the Y1 side in the Y direction, is turned back by the header 14-1, and flows through the primary flow channel members 100 of the primary layered structure 10-2 to the Y2 side.

Similarly, the header 12-2 has a side surface on the Y2 side in the Y direction to which two piping 30-1 and 30-2 (see FIG. 10) can be coupled, and the header 12-1 can be coupled to the cooling apparatus via the piping 30-1 and 30-2. The header 12-2 has a partition plate (not illustrated) similar to the header 12 according to the first embodiment described above and has two chambers 121-2, 122-2 separated from each other. The chamber 122-2 is in fluid communication with the piping 30-1 and the chamber 121-2 in fluid communication with the piping 30-2.

The chamber 121-2 is commonly in fluid communication with each of the plurality of primary flow channels 101 related to the primary layered structure 10-3. The chamber 122-2 is commonly in fluid communication with each of the plurality of primary flow channels 101 related to the primary layered structure 10-4. The header 14-2 is commonly in fluid communication with each of the plurality of primary flow channels 101 related to the primary layered structure 10-3 and each of the plurality of primary flow channels 101 related to the primary layered structure 10-4. The primary refrigerant flows through the primary flow channel members 100 of the primary layered structure 10-3 to the Y1 side in the Y direction, is turned back by the header 14-2, and flows through the primary flow channel members 100 of the primary layered structure 10-4 to the Y2 side.

According to the second embodiment, the same effects as the first embodiment described above can be obtained. In particular, according to the second embodiment, as illustrated in FIG. 10, the headers 12-1 and 12-2 are separated in the X direction, and the headers 14-1 and 14-2 are separated in the X direction. Accordingly, a flow of air passing between the header 12-1 and 12-2 in the X direction (see an arrow R41 in FIG. 10) and a flow of air passing between the header 14-1 and 14-2 in the X direction (see an arrow R42 in FIG. 10) can be established. As a result, since the flow rate of the air that can pass through the heat exchanger 1A is increased, it is possible to enhance the cooling function by air flow through the heat exchanger 1A.

Third Embodiment

Next, with reference to FIGS. 11 to 15, a third embodiment is described. In the description of the third embodiment, elements different from the first embodiment described above are described, and other elements may be the same as those in the first embodiment.

Figure 11:
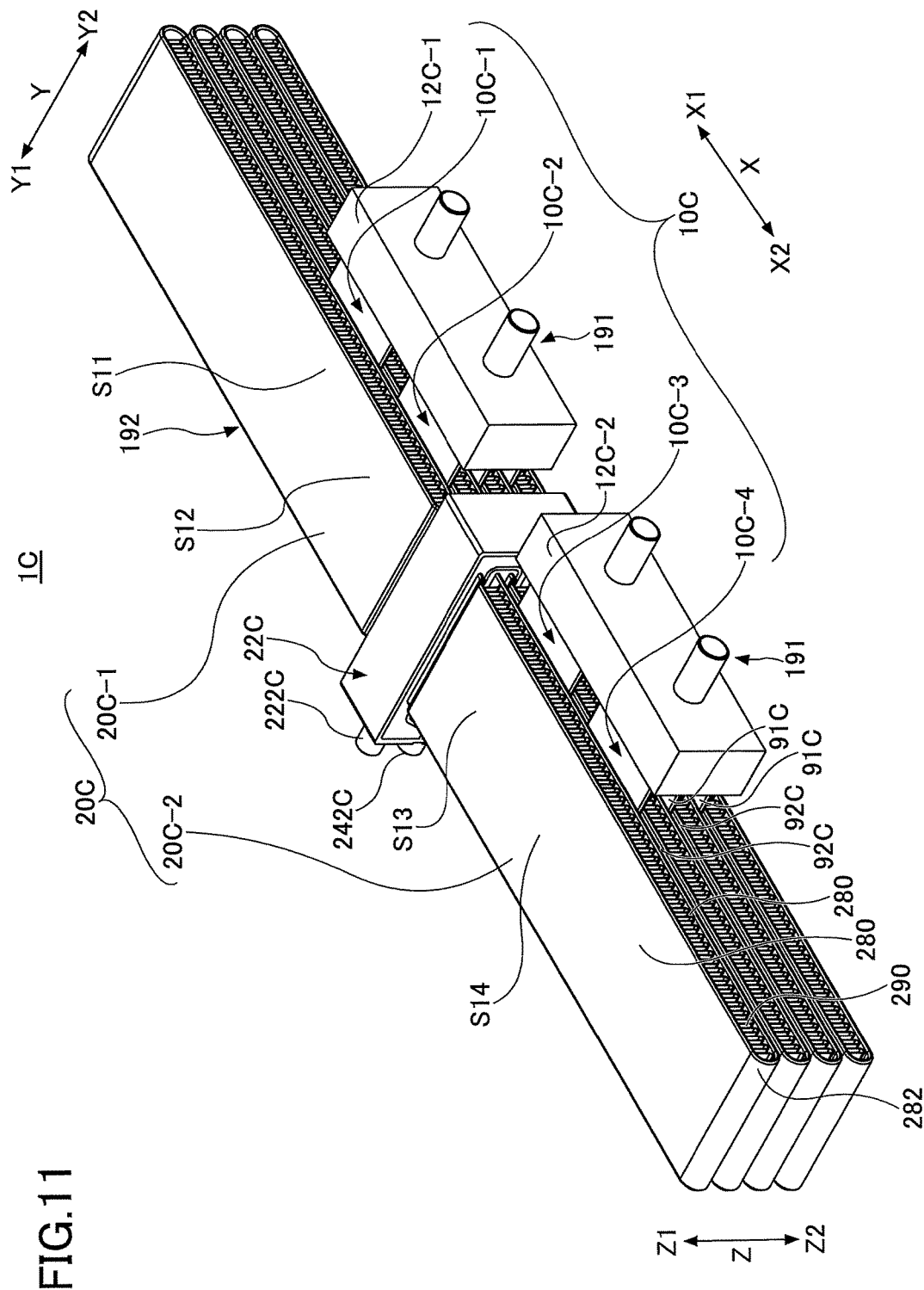
FIG. 11 is a perspective view of a heat exchanger according to a third embodiment.

FIG. 11 is a perspective view of a heat exchanger 1C according to the third embodiment.

The heat exchanger 1C includes a primary layered structure 10C, a header 12C-1, 12C-2 (an example of a first header), a secondary layered structure 20C, a header 22C (an example of a second header). Heat exchange between the primary layered structure 10C for the primary refrigerant and the secondary layered structure 20C for the secondary refrigerant is implemented between the primary refrigerant and the secondary refrigerant.

The primary layered structure 10C extends in the Y direction. A plurality of the primary layered structures 10C are provided at intervals in the X direction. In the example illustrated in FIG. 11, four primary layered structures 10C are provided at intervals in the X direction. Hereinafter, when describing one specific primary layered structure 10C, reference numerals are assigned such as primary layered structures 10C-1, 10C-2, 10C-3, and 10C-4. The primary layered structures 10C-1, 10C-2, together with the header 12C-1, form a first assembly 191, and the primary layered structures 10C-3, 10C-4, together with the header 12C-2, form another separate first assembly 191. These two first assemblies 191, independently of one another, are spaced apart in the X direction.

Figure 12:
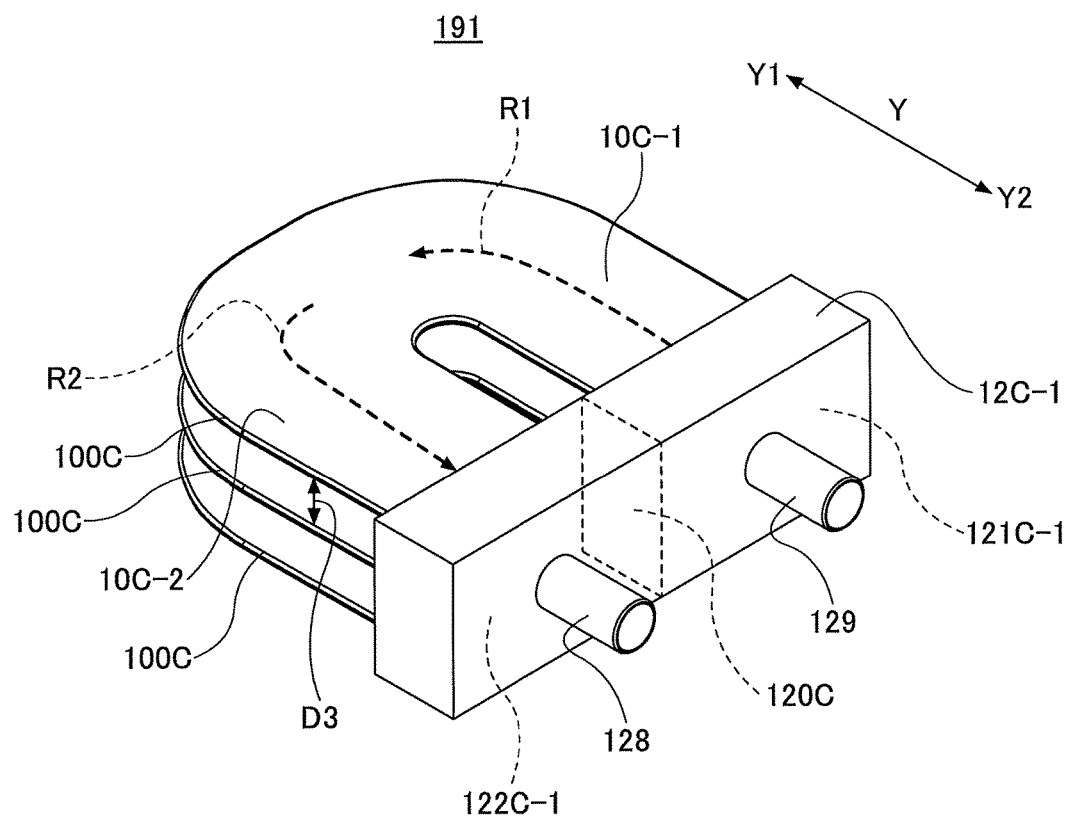
FIG. 12 is a view illustrating an example of a first assembly according to the third embodiment.

FIG. 12 is a diagram illustrating an example of the first assembly 191. The first assemblies 191 have substantially the same configuration, and thus only one first assembly 191 is described here as a representative. In FIGS. 12 and 1, arrows R1 and R2 schematically indicate a flowing direction of the first refrigerant.

The primary layered structure 10C-1, 10C-2, as illustrated in FIG. 12, are integrated (i.e., formed continuously) to have a U-shaped form in top view. The primary layered structure 10C-1, 10C-2 each include a plurality of primary channel members 100C (examples of first flow channel members) layered in the Z direction. In the example illustrated in FIG. 12, the primary layered structure of 10C-1 and of 10C-2 is a layered structure of three primary channel members 100C; however, the number of the layered primary channel members 100C is arbitrary. A layered structure in the Z direction of the plurality of primary flow channel members 100C is described in detail later.

The plurality of primary channel members 100C each include primary fluid channels for the primary refrigerant (not illustrated) (an example of a first flow channel) formed therein. Each primary channel member 100C may be a multi-hole tube or a flat tube having a single hole. The plurality of primary channel members 100C have the same form. The plurality of primary channel members 100C in the primary layered structures 10C-1, 10C-2, respectively, extend in the XY plane such that the primary channel members 100C are spaced in the Z direction by a predetermined distance D3.

The header 12C-1 is provided on the Y2 side in the Y direction of the primary layered structures 10C-1,10C-2. The header 12C-1 has coupling portions 128, 129 on the side surface of the Y2 side in the Y direction to which two piping (not illustrated) can be coupled via piping, and can be coupled to the cooling apparatus via the piping. The header 12C-1, like the header 12-1 according to the second embodiment described above, has a partition plate 120C to have two inside separate chambers 121C-1,122C-1. The chamber 122C-1 can be coupled to the cooling apparatus via the coupling portion 128, and the chamber 121C-1 can be coupled to the cooling apparatus via the coupling portion 129.

The chamber 121C-1 is commonly in fluid communication with each of the plurality of primary flow channels related to the primary layered structure 10C-1. The chamber 122C-1 is commonly in fluid communication with each of the plurality of primary flow channels related to the primary layered structure 10C-2. The primary refrigerant, as illustrated in FIG. 12, flows to the Y1 side in the Y direction through the primary channel members 100C of the primary layered structure 10C-1, is turned back at the end of the Y1 side, and flows to the Y2 side through the primary channel members 100C of the primary layered structure 10C-2 (see arrows R1, R2 in FIG. 12).

The secondary layered structure 20C, together with the header 22C, forms a second assembly 192.

Figure 13:
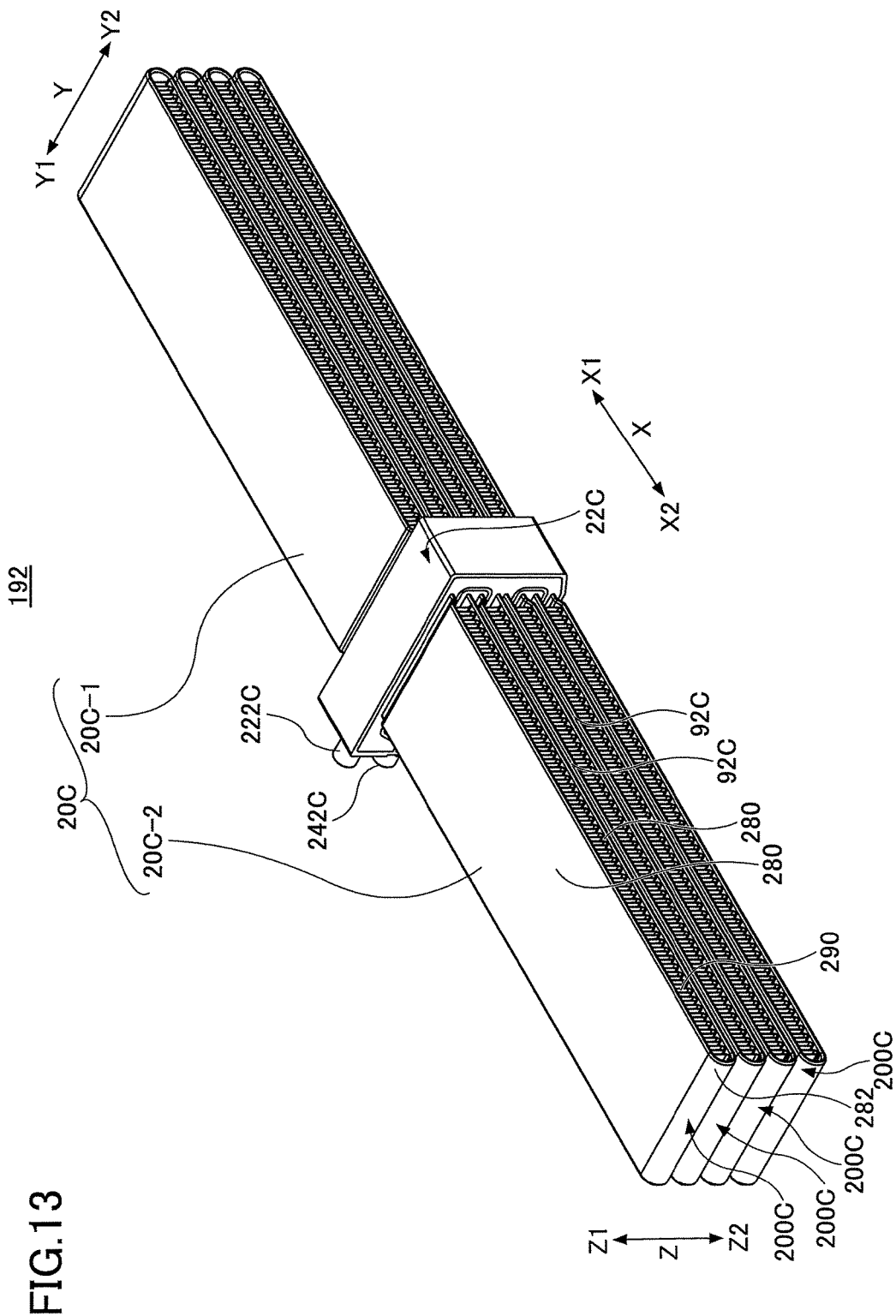
FIG. 13 is a view illustrating an example of a second assembly according to the third embodiment.

FIG. 13 is a diagram illustrating an example of the second assembly 192. The second assembly 192 has a configuration as disclosed in, for example, Japanese Laid-open Patent Publication No. 2013-160430. Briefly, two secondary layered structures 20C are provided on the opposite sides of the header 22C in the X direction. Hereinafter, when describing one specific secondary layered structure 20C, reference numerals are assigned such as primary layered structures 20C-1, 20C-2. The secondary layered structures 20C extend in the X direction, and the secondary layered structure 20C-1,20C-2 are provided symmetrically with respect to the header 22C. The secondary layered structures 20C-1, 20C-2 each include a plurality of secondary channel members 200C (examples of second flow channel members) layered in the Z direction. The plurality of secondary channel members 200C each include secondary fluid channels for the secondary refrigerant (not illustrated) (an example of a second flow channel) formed therein. The secondary flow channels 200C extend in the X direction. A plurality of secondary flow channel members 200C each have the same form, in a U-shaped form, when viewed in the Y direction. That is, each secondary flow channel member 200C has parallel plate portions 280 on the opposite sides in the Z direction. The flat plate portions 280 each are in a flat tubular form whose height in the Z direction is small. The secondary flow channel member 200C is in fluid communication with the header 22C on one side, and has a curved portion 282 on the other side. It is noted that the primary channel members 100C each may be a multi-hole tube or a flat tube having a single hole. In each secondary flow channel member 200C, the secondary refrigerant is introduced from the end of the header 22C side to flow in a direction away from the header 22C side in the X direction, is turned at the end portion in the X direction (i.e., at the curved portion 282), and flows toward the header 22C side in the X direction. Each secondary flow channel member 200C includes fins 290 between the flat plate portions 280 in the Z direction. The plurality of secondary flow channel members 200C are provided such that the secondary flow channel member 200C are spaced in the Z direction by a predetermined distance D4 (not illustrated).

Also, according to the third embodiment, the primary layered structures 10C and the secondary layered structure 20C partially have overlapping (intersecting) ranges in a top view (in a layered direction view). In the example illustrated in FIG. 11, an intersecting range S11 between the secondary layered structure 20C-1 and the primary layered structure 10C-1 and an intersecting range S12 between the secondary layered structure 20C-1 and the primary layered structure 10C-2 are illustrated. Further, an intersecting range S13 between the secondary layered structure 20C-2 and the primary layered structure 10C-3 and an intersecting range S14 between the secondary layered structure 20C-2 and the primary layered structure 10C-4 are illustrated.

In each of the intersecting ranges S11 to S14, the plurality of secondary flow channel members 200C are layered in the Z direction via corresponding one of the plurality of primary flow channel members 100C. That is, each of the plurality of secondary flow channel members 200C and each of the plurality of primary flow channel members 100C are alternately layered in the Z direction. In each of the intersecting ranges S11 to S14, each primary flow channel member 100C and each secondary flow channel member 200C adjacent to each other in the Z direction are preferably in surface contact with each other in the Z direction. In this case, the height of each primary flow channel member 100C corresponds to the predetermined distance D4 between the plurality of secondary flow channel members 200C in the Z direction, and the height of each secondary flow channel member 200C corresponds to the predetermined distance D3 between the plurality of primary flow channel members 100C in the Z direction. With this arrangement, it becomes possible to increase the efficiency of heat exchange between the primary refrigerant and the secondary refrigerant. It is noted that a contact assisting material such as a brazing material or a thermal grease may be applied to each contact surface between the primary flow channel members 100C and the secondary flow channel members 200C adjacent in the Z direction.

Additionally, the primary layered structures 10C have spaces 91C between the layers of the plurality of primary flow channel members 100C in each non-intersecting range related to the primary layered structures 10C. That is, in the non-intersecting ranges related to the primary layered structures 10C, the primary layered structures 10C have the spaces 91C between neighboring primary flow channel members 100C in the Z direction. It is noted that the height of the space 91C corresponds to the predetermined distance D3. In the example illustrated in FIG. 11, the non-intersecting ranges related to the primary layered structure 10C extend in the Y direction between the header 12C-1 and the secondary layered structure 20C, and between the header 12C-2 and the secondary layered structure 20C, respectively. Since there are the spaces 91C between the layers in the non-intersecting ranges related to the primary layered structure 10C, air can pass in the X direction and the efficiency of heat exchange can be increased.

Similarly, the secondary layered structures 20C have spaces 92C between the layers of the plurality of secondary flow channel members 200C in each non-intersecting range related to the secondary layered structures 20C. That is, in the non-intersecting ranges related to the secondary layered structures 20C, the secondary layered structures 20C have the spaces 92C between neighboring secondary flow channel members 200C in the Z direction. It is noted that the height of the space 92C corresponds to the predetermined distance D4. In the example illustrated in FIG. 11, the non-intersecting ranges relating to the secondary layered structure 20C extend in the X direction between the header 22C and the primary layered structure 10C-2 and between the primary layered structure 10-3 and the header 22C, respectively. In addition, the non-intersecting ranges related to the secondary layered structure 20C extend in the X direction between the primary layered structures 10C-1 and 10C-2, and between the primary layered structures 10C-3 and 10C-4, respectively. In addition, the non-intersecting ranges related to the secondary layered structure 20C extend in the X direction on the X1 side with respect to the primary layered structure 10C-1, and on the X2 side with respect to the primary layered structure 10C-4, respectively. Since there are the spaces 92C between the layers in the non-intersecting ranges related to the secondary layered structure 20C, air can pass in the Y direction and the efficiency of heat exchange can be increased. That is, because of the first assemblies 191 with respect to the heat exchanger 192 of air cooling type, such that heat exchange between liquids in addition to air cooling can be implemented, it is possible to enhance the heat exchange efficiency.

Figure 14:
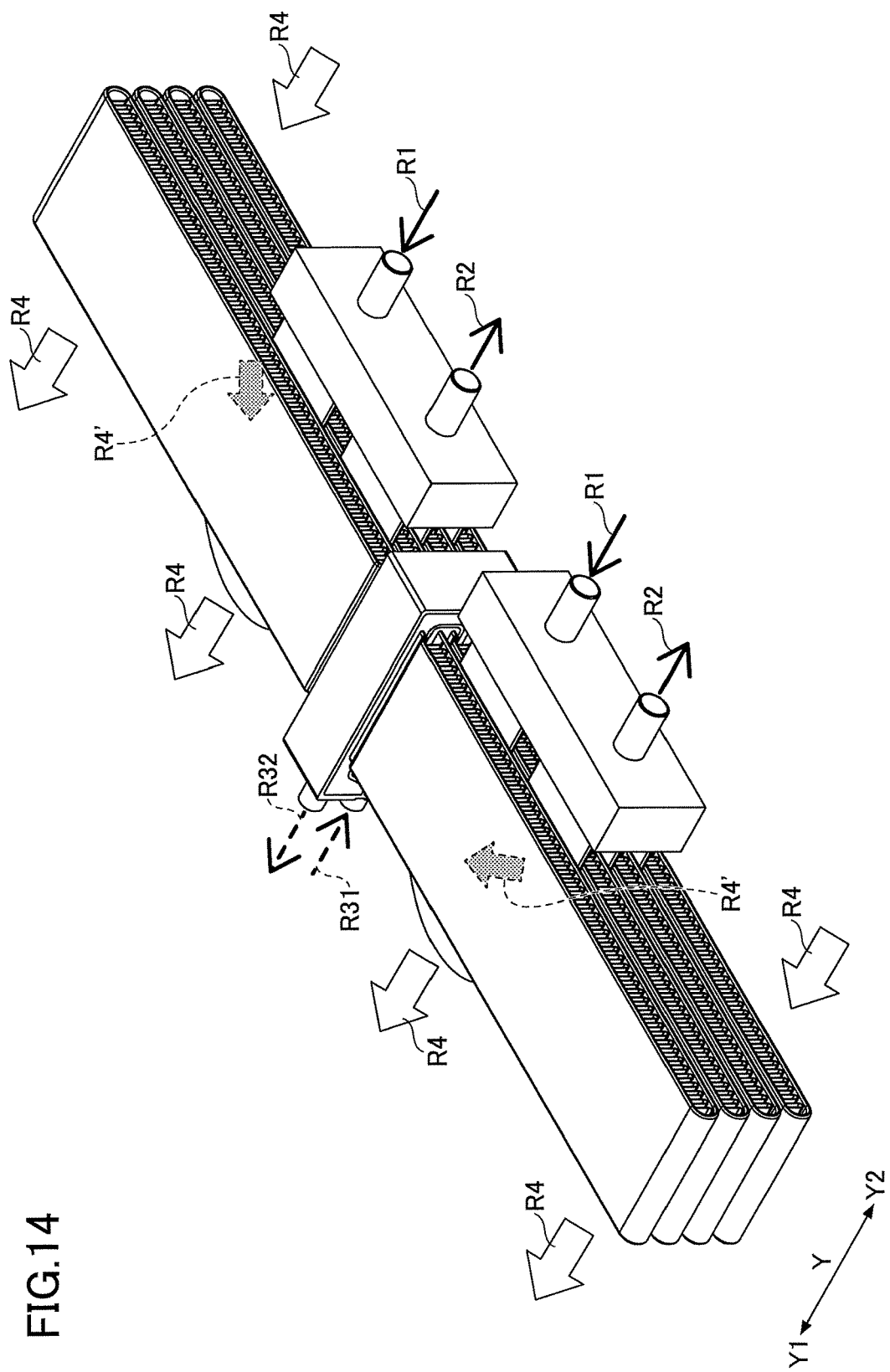
FIG. 14 is a diagram explaining a heat exchange function of the heat exchanger according to the third embodiment.

Next, with reference to FIG. 14, a heat exchange function of the heat exchanger 1C is described.

The primary coolant flows to the Y1 side in the Y direction through the primary channel members 100C in the primary layered structure 10C, is turned back, and flows to the Y2 side, as indicated by arrows R1, R2 in FIG. 14. The primary refrigerant in the primary layered structure 10C can realize the heat exchange with the secondary refrigerant in the secondary layered structure 20C in the intersecting ranges. Specifically, the primary refrigerant in the primary layered structure 10C cools the secondary refrigerant by removing the heat of the secondary refrigerant in the secondary layered structure 20C in the intersecting ranges.

Further, the primary layered structure 10C can realize the heat exchange with the air in the spaces 91C described above in the non-intersecting ranges related to the primary layered structure 10C. For example, the primary refrigerant in the primary layered structure 10C cools the air in the spaces 91C by removing the heat of the air in the spaces 91C in each non-intersecting range related to the primary layered structures 10C. It is noted that the air in the spaces 91C can flow to the heat emitting element by means of the fan, for example. In this case, as compared with an approach of cooling the heat emitting element with air not passing through the space 91C, efficient cooling can be implemented.

Further, the secondary layered structure 20C can realize the heat exchange with the air in the spaces 92C described above in the non-intersecting ranges related to the secondary layered structure 20C. For example, the secondary refrigerant in the secondary layered structures 20C is cooled by being deprived of heat by the air in the spaces 92C in each non-intersecting range related to the secondary layered structures 20C. Also, when the air cooled in the non-intersecting ranges related to the primary layered structure 10C passes through the space 92C as described above, the cooling efficiency of the secondary refrigerant in the non-intersecting ranges related to the secondary layered structure 20C can be efficiently increased.

In this way, also according to the third embodiment, the same effects as the first embodiment described above can be obtained. Further, the heat exchanger 1C can be incorporated in the information processing apparatus (see the information processing apparatus 60 described above), as is the case with the first embodiment described above. In this respect, because the heat exchanger 1C has spaces 91C and 92C as described above, the flow of air passing through the spaces 91C and 92C can be generated even when the heat exchanger 1C is placed in the unit case of the information processing apparatus (see the unit case 61 as described above). Thus, even when the heat exchanger 1C is placed in the unit case, it is possible to efficiently cool the heat emitting element in the unit case.

Figure 15:
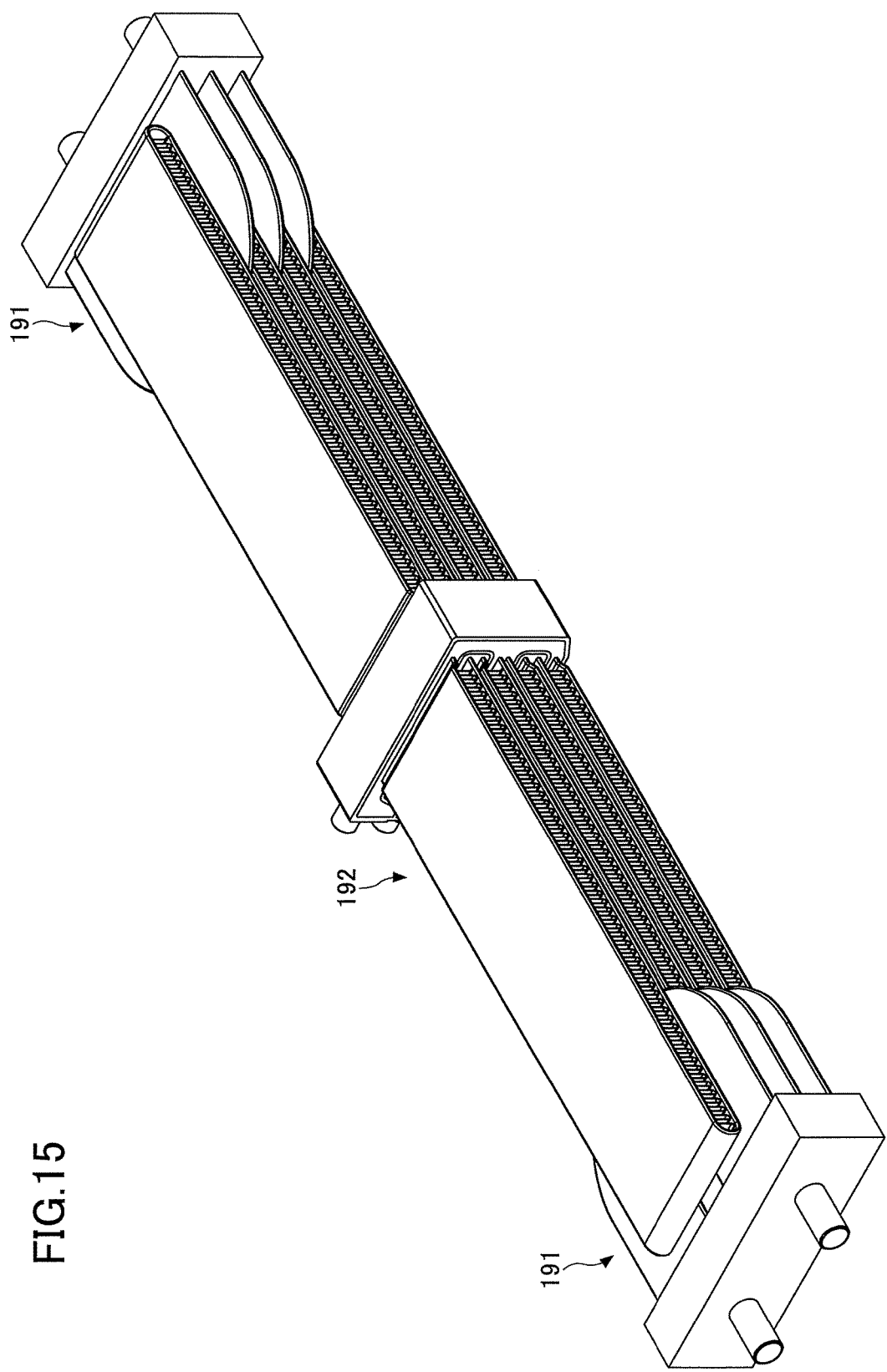
FIG. 15 is a diagram explaining an arrangement modification according to the third embodiment.

It is noted that, according to the third embodiment described above, the first assemblies 191 are provided for the second assembly 192 in the orientation illustrated in FIG. 11; however, this is not indispensable. For example, the first assemblies 191 may be provided for the second assembly 192 in such an orientation as illustrated in FIG. 15. In the example illustrated in FIG. 15, the first assemblies 191 have the orientation changed by 90 degrees in the XY plane with respect to the orientation illustrated in FIG. 11, and are provided at the opposite ends in the X direction of the second assembly 192, respectively. Also, according to such a variant, the same effects as in the third embodiment described above can be obtained. Particularly, in the case of such a variant, the headers 12C-1,12C-2 of the first assemblies 191 are provided in ranges that do not overlap the secondary flow channel members 200C of the second assembly 192 when viewed in the Y-direction, the flow of air through the spaces 91C is improved. Therefore, it is possible to enhance the cooling function by air flow through the heat exchanger.

Further, in the third embodiment described above, two of the first assemblies 191 are provided for one of the second assembly 192, the number of only one of the first assemblies 191 is arbitrary. Therefore, the first assembly 191 may be provided only one for one second assembly 192, or three or more may be provided for one second assembly 192.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention. Further, all or part of the components of the embodiments described above can be combined.

For example, in the third embodiment described above, the primary layered structure 10C has the nonintersecting ranges related to the primary layered structure 10C; however, this is not indispensable. The primary layered structure 10C is not required to have any non-intersecting range related to the primary layered structure 10C. This is the same in the first and second embodiments described above.

Further, in the first embodiment described above, the primary refrigerant is passed through the primary layered structures 10 and the secondary refrigerant is passed through the secondary layered structure 20; however, this may be reversed. In this case, when the heat exchanger 1 is mounted in the information processing apparatus 60, the orientation of the heat exchanger 1 may be inverted in the Y-direction relative to the orientation illustrated in FIG. 7, for example. In this case, the secondary layered structure 20 is coupled to the cooling apparatus, and the primary layered structures 10 are coupled to the piping 2221 and 2421 which in turn are thermally coupled to the heat emitting element. Such a variant is applicable also in the second and third embodiments described above.

Further, in the first embodiment described above, the two primary layered structures 10-1, 10-2 are coupled to the chamber 121 of the header 12; however, the number of the primary layered structures 10 coupled to the chamber 121 of the header 12 is arbitrary. This also applies to the chamber 122 of the header 12. Further, the header 12 has the partition plate 120 which forms the chamber 121 and the chamber 122; however, there may be two separate headers that form the chamber 121 and the chamber 122.

Further, in the second embodiment described above, a pair of two primary layered structures 10 is provided in two pairs; however the number of such pairs is arbitrary.

What is claimed is:

1. An information processing apparatus, comprising:
   a first heat emitting device; and
   a heat exchanger configured to exchange heat generated from the first heat emitting device, wherein:
   the heat exchanger includes
   a first layered structure of layers of a plurality of first flow channel members, each of the first flow channel members having one or more first flow channels formed therein for a first coolant that is liquid,
   a first header in fluid communication with the first flow channel members,
   a second layered structure of layers of a plurality of second flow channel members, each of the second flow channel members having one or more second flow channels formed therein for a second coolant that is liquid, and
   a second header in fluid communication with the second flow channel members;
   the first layered structure and the second layered structure are overlapped in a first region when viewed in a layered direction;
   in the first region, the first fluid channel members and the second fluid channel members opposed to each other in the layered direction are in surface contact with each other in the layered direction; and
   the first layered structure and the second layered structure have spaces between layers in a second region different from the first region, enabling air to pass through the spaces in the heat exchanger and flow to a downstream side of the heat exchanger, and wherein the first heat emitting device on the downstream side of the heat exchanger is cooled by both the flow of air and the heat exchange between the first coolant and the second coolant.

2. The information processing apparatus of claim 1, wherein a plurality of the first layered structures are provided with a spacing therebetween in a direction perpendicular to the layered direction, and
the second region extends within the spacing formed between the first layered structures.

3. The information processing apparatus of claim 2, wherein the first header includes at least two separated chambers.

4. The information processing apparatus of claim 1, wherein the second region extends between the second header and the first region.

5. The information processing apparatus of claim 1, further comprising a fan configured to generate a flow of air passing through the second region.

6. The information processing apparatus of claim 5, further comprising a second heat emitting device, wherein the flow of air generated by the fan cools the second heat emitting device.

7. The information processing apparatus of claim 6, wherein the second heat emitting device is disposed downstream of the first layered structure and the second layered structure in a direction of the flow of air.

8. The information processing apparatus of claim 5, wherein the second layered structure includes the second region, and
a rotation axis of the fan is perpendicular to the layered direction and a direction of the second flow channels in the second region.

9. The information processing apparatus of claim 8, wherein a direction of the first flow channels in the first region is perpendicular to the direction of the second flow channels in the first region when viewed in the layered direction.

10. The information processing apparatus of claim 1, wherein the first flow channels and the second flow channels extend in a plane perpendicular to the layered direction.

11. The information processing apparatus of claim 1, wherein the first flow channels or the second flow channels are formed by a multi-hole pipe.

12. The information processing apparatus of claim 1, wherein the first coolant is a primary coolant, the second coolant is a secondary coolant that is cooled via the first coolant, and the first heat emitting device is cooled by the second coolant.

13. The information processing apparatus of claim 12, further comprising piping that has a first end coupled to a first coupling portion of the second header and a second end coupled to a second coupling portion of the second header, the piping passing through a heat receiving part, the heat receiving part being thermally coupled to the first heat emitting device.

14. A heat exchanger, comprising:
a first layered structure of layers of a plurality of first flow channel members, each of the first flow channel members having one or more first flow channels formed therein for a first coolant that is liquid;
a first header in fluid communication with the first flow channel members;
a second layered structure of layers of a plurality of second flow channel members, each of the second flow channel members having one or more second flow channels formed therein for a second coolant that is liquid; and
a second header in fluid communication with the second flow channel members, wherein:
the first layered structure and the second layered structure are overlapped in a first region when viewed in a layered direction;
in the first region, the first fluid channel members and the second fluid channel members opposed to each other in the layered direction are in surface contact with each other in the layered direction; and
the first layered structure and the second layered structure have spaces between layers in a second region different from the first region, enabling air to pass through the spaces in the heat exchanger and flow to a downstream side of the heat exchanger, wherein a first heat emitting device on the downstream side of the heat exchanger is cooled by both the flow of air and the heat exchange between the first coolant and the second coolant.

* * * * *